(12) United States Patent
Liu et al.

(10) Patent No.: US 11,676,029 B2
(45) Date of Patent: Jun. 13, 2023

(54) NEURAL NETWORK QUANTIZATION PARAMETER DETERMINATION METHOD AND RELATED PRODUCTS

(71) Applicant: SHANGHAI CAMBRICON INFORMATION TECHNOLOGY CO., LTD, Shanghai (CN)

(72) Inventors: Shaoli Liu, Shanghai (CN); Xiaofu Meng, Shanghai (CN); Xishan Zhang, Shanghai (CN); Jiaming Guo, Shanghai (CN)

(73) Assignee: SHANGHAI CAMBRICON INFORMATION TECHNOLOGY CO., LTD, Shanghai (CN)

( * ) Notice: Subject to any disclaimer, the term of this patent is extended or adjusted under 35 U.S.C. 154(b) by 412 days.

(21) Appl. No.: 16/720,113

(22) Filed: Dec. 19, 2019

(65) Prior Publication Data
US 2020/0394523 A1    Dec. 17, 2020

Related U.S. Application Data

(63) Continuation of application No. 16/622,541, filed as application No. PCT/CN2019/106754 on Sep. 19, 2019.

(30) Foreign Application Priority Data

Jun. 12, 2019  (CN) .......................... 201910505239.7
Jun. 14, 2019  (CN) .......................... 201910515355.7
(Continued)

(51) Int. Cl.
*G06N 3/084*    (2023.01)
*G06F 17/18*    (2006.01)
*G06N 20/00*   (2019.01)

(52) U.S. Cl.
CPC ............. *G06N 3/084* (2013.01); *G06F 17/18* (2013.01); *G06N 20/00* (2019.01)

(58) Field of Classification Search
CPC ...... G06N 3/084; G06N 20/00; G06N 3/0454; G06N 3/063; G06F 17/18
(Continued)

(56) References Cited

U.S. PATENT DOCUMENTS 5,052,043 A    9/1991  Gaborski
6,144,977 A   11/2000  Giangarra et al.
(Continued)

FOREIGN PATENT DOCUMENTS

CN    1503858 A    6/2004
CN    1503958 A    6/2004
(Continued)

OTHER PUBLICATIONS

European Patent Office, Extended European Search Report for European Application No. 19218382.0 dated Apr. 24, 2020.
(Continued)

*Primary Examiner* — Yair Leibovich
(74) *Attorney, Agent, or Firm* — Rimon PC

(57) ABSTRACT

The present disclosure relates to a neural network quantization parameter determination method and related products. A board card in the related products includes a memory device, an interface device, a control device, and an artificial intelligence chip, in which the artificial intelligence chip is connected with the memory device, the control device, and the interface device respectively. The memory device is configured to store data, and the interface device is configured to transmit data between the artificial intelligence chip and an external device. The control device is configured to
(Continued)

At a predicted time point, determining a variation trend value of a point position parameter corresponding to the data to be quantized in the process of weight iteration; in which the predicted time point is configured to determine whether the data bit width needs to be adjusted or not, and the predicted time point corresponds to the time point when the weight update iteration is completed.    801

Determining the corresponding target iteration interval according to the variation trend value of the point position parameter.    802 monitor the state of the artificial intelligence chip. The board card can be used to perform an artificial intelligence computation.

22 Claims, 6 Drawing Sheets

(30) Foreign Application Priority Data

Jun. 18, 2019 (CN) .......................... 201910528537.8
Jun. 27, 2019 (CN) .......................... 201910570125.0

(58) Field of Classification Search
USPC .......................................................... 706/25
See application file for complete search history.

(56) References Cited

U.S. PATENT DOCUMENTS

| | | |
|---|---|---|
| 6,671,796 B1 | 12/2003 | Sudharsanan et al. |
| 6,715,065 B1 | 3/2004 | Ebata et al. |
| 6,931,639 B1 | 8/2005 | Eickemeyer |
| 7,236,995 B2 | 6/2007 | Hinds |
| 7,242,414 B1 | 7/2007 | Thekkath et al. |
| 7,406,451 B2 | 7/2008 | Mrziglod et al. |
| 7,721,128 B2 | 5/2010 | Johns et al. |
| 7,945,607 B2 | 5/2011 | Hinds |
| 8,051,117 B2 | 11/2011 | Lundvall et al. |
| 8,190,664 B2 | 5/2012 | Lundvall et al. |
| 8,335,811 B2 * | 12/2012 | Zhong ............... G06F 17/147 708/401 |
| 8,560,591 B2 | 10/2013 | Lundvall et al. |
| 8,694,572 B2 | 4/2014 | Samy et al. |
| 8,762,438 B2 | 6/2014 | Lundvall et al. |
| 8,924,455 B1 | 12/2014 | Barman et al. |
| 9,412,366 B2 | 8/2016 | Wilensky et al. |
| 9,916,531 B1 | 3/2018 | Zivkovic et al. |
| 10,187,568 B1 | 1/2019 | Tran et al. |
| 10,224,954 B1 | 3/2019 | Madduri et al. |
| 10,360,304 B1 | 7/2019 | Alvarez et al. |
| 10,427,306 B1 | 10/2019 | Quinlan et al. |
| 10,656,942 B2 | 5/2020 | Madduri et al. |
| 10,929,744 B2 | 2/2021 | Li et al. |
| 2002/0138714 A1 | 9/2002 | Leibholz et al. |
| 2003/0167460 A1 | 9/2003 | Desai et al. |
| 2005/0138327 A1 | 6/2005 | Tabei |
| 2006/0161375 A1 | 7/2006 | Duberstein et al. |
| 2007/0220076 A1 | 9/2007 | Hinds |
| 2008/0148120 A1 | 6/2008 | Seuring |
| 2009/0113186 A1 | 4/2009 | Kato et al. |
| 2009/0125293 A1 | 5/2009 | Lefurgy et al. |
| 2010/0073068 A1 | 3/2010 | Cho et al. |
| 2011/0060587 A1 | 3/2011 | Phillips et al. |
| 2011/0301777 A1 | 12/2011 | Cox et al. |
| 2012/0316845 A1 | 12/2012 | Grey et al. |
| 2013/0054110 A1 | 2/2013 | Sata |
| 2013/0332610 A1 | 12/2013 | Beveridge |
| 2014/0081625 A1 | 3/2014 | Wilensky et al. |
| 2014/0164737 A1 | 6/2014 | Collange et al. |
| 2014/0249814 A1 | 9/2014 | Nakano et al. |
| 2015/0134581 A1 | 5/2015 | Doeding et al. |
| 2015/0370303 A1 | 12/2015 | Krishnaswamy et al. |
| 2016/0026231 A1 | 1/2016 | Ignowski et al. |
| 2016/0054922 A1 | 2/2016 | Awasthi et al. |
| 2016/0124710 A1 | 5/2016 | Lutz et al. |
| 2016/0170866 A1 | 6/2016 | Ioualalen et al. |
| 2016/0328645 A1 | 11/2016 | Lin et al. |
| 2016/0328647 A1 | 11/2016 | Lin et al. |
| 2017/0061279 A1 | 3/2017 | Yang et al. |
| 2017/0090956 A1 | 3/2017 | Linsky |
| 2017/0103022 A1 | 4/2017 | Kreinin et al. |
| 2017/0142327 A1 | 5/2017 | Bayani |
| 2017/0161604 A1 | 6/2017 | Craddock et al. |
| 2017/0221176 A1 | 8/2017 | Munteanu et al. |
| 2017/0257079 A1 | 9/2017 | Jain et al. |
| 2017/0262959 A1 | 9/2017 | Lee et al. |
| 2017/0316307 A1 | 11/2017 | Koster et al. |
| 2017/0316312 A1 | 11/2017 | Goyal et al. |
| 2017/0344882 A1 | 11/2017 | Ambrose et al. |
| 2017/0353163 A1 | 12/2017 | Gazneli et al. |
| 2017/0357530 A1 | 12/2017 | Shih et al. |
| 2017/0357910 A1 | 12/2017 | Sommer et al. |
| 2018/0046903 A1 | 2/2018 | Yao et al. |
| 2018/0088996 A1 | 3/2018 | Rossi et al. |
| 2018/0096243 A1 | 4/2018 | Patil et al. |
| 2018/0157464 A1 | 6/2018 | Lutz et al. |
| 2018/0288440 A1 | 10/2018 | Chao |
| 2018/0293517 A1 | 10/2018 | Browne et al. |
| 2018/0300931 A1 | 10/2018 | Vembu et al. |
| 2018/0322391 A1 | 11/2018 | Wu et al. |
| 2018/0357541 A1 | 12/2018 | Chen et al. |
| 2018/0367729 A1 | 12/2018 | Parasnis et al. |
| 2018/0373976 A1 | 12/2018 | Woo |
| 2019/0034784 A1 | 1/2019 | Li et al. |
| 2019/0042925 A1 | 2/2019 | Choe et al. |
| 2019/0050710 A1 | 2/2019 | Wang et al. |
| 2019/0057696 A1 | 2/2019 | Ogawa |
| 2019/0114142 A1 | 4/2019 | Yoda et al. |
| 2019/0122094 A1 | 4/2019 | Chen et al. |
| 2019/0122119 A1 | 4/2019 | Husain |
| 2019/0138372 A1 | 5/2019 | Tee |
| 2019/0164285 A1 | 5/2019 | Nye et al. |
| 2019/0180170 A1 | 6/2019 | Huang et al. |
| 2019/0199370 A1 | 6/2019 | Madduri et al. |
| 2019/0205737 A1 | 7/2019 | Bleiweiss et al. |
| 2019/0205746 A1 | 7/2019 | Nurvitadhi et al. |
| 2019/0220734 A1 | 7/2019 | Ferdman et al. |
| 2019/0228762 A1 | 7/2019 | Wang et al. |
| 2019/0251429 A1 | 8/2019 | Du et al. |
| 2019/0265949 A1 | 8/2019 | Ito |
| 2019/0278677 A1 | 9/2019 | Terechko et al. |
| 2019/0294968 A1 | 9/2019 | Vantrease et al. |
| 2019/0339937 A1 | 11/2019 | Lo et al. |
| 2020/0005424 A1 | 1/2020 | Appu et al. |
| 2020/0097799 A1 | 3/2020 | Divakar et al. |
| 2020/0117453 A1 | 4/2020 | Zhang et al. |
| 2020/0117614 A1 | 4/2020 | Zhang et al. |
| 2020/0125508 A1 | 4/2020 | Liu et al. |
| 2020/0126554 A1 | 4/2020 | Chen et al. |
| 2020/0126555 A1 | 4/2020 | Chen et al. |
| 2020/0142748 A1 | 5/2020 | Liu et al. |
| 2020/0159527 A1 | 5/2020 | Zhang et al. |
| 2020/0159530 A1 | 5/2020 | Zhang et al. |
| 2020/0159531 A1 | 5/2020 | Zhang et al. |
| 2020/0159532 A1 | 5/2020 | Zhang et al. |
| 2020/0159533 A1 | 5/2020 | Zhang et al. |
| 2020/0159534 A1 | 5/2020 | Li et al. |
| 2020/0160162 A1 | 5/2020 | Zhang et al. |
| 2020/0160163 A1 | 5/2020 | Liu et al. |
| 2020/0160219 A1 | 5/2020 | Zhang et al. |
| 2020/0160220 A1 | 5/2020 | Zhang et al. |
| 2020/0160221 A1 | 5/2020 | Zhang et al. |
| 2020/0160222 A1 | 5/2020 | Zhang et al. |
| 2020/0168227 A1 | 5/2020 | Chen et al. |
| 2020/0174547 A1 | 6/2020 | Fang et al. |
| 2020/0183752 A1 | 6/2020 | Liu et al. |
| 2020/0241874 A1 | 7/2020 | Chen et al. |
| 2020/0257972 A1 | 8/2020 | Miniskar et al. |
| 2020/0334041 A1 | 10/2020 | Zhang et al. |
| 2020/0334522 A1 | 10/2020 | Zhang et al. |
| 2020/0334572 A1 | 10/2020 | Zhang et al. |
| 2020/0364552 A1* | 11/2020 | Guo ........................ G06N 3/08 |
| 2020/0394522 A1* | 12/2020 | Liu ........................ G06N 3/063 |
| 2021/0042889 A1 | 2/2021 | Pei |
| 2021/0061028 A1 | 3/2021 | Da Deppo et al. |
| 2021/0117768 A1 | 4/2021 | Liu et al. |
| 2021/0117810 A1 | 4/2021 | Liu |
| 2021/0182177 A1 | 6/2021 | Su et al. |
| 2021/0264270 A1 | 8/2021 | Liu et al. |
| 2021/0286688 A1* | 9/2021 | Liu ........................ G06N 3/084 |
| 2021/0334007 A1 | 10/2021 | Liu et al. |
| 2021/0334137 A1 | 10/2021 | Zhang et al. |
| 2021/0341989 A1 | 11/2021 | Chen et al. |

(56) References Cited

U.S. PATENT DOCUMENTS

| | | |
|---|---|---|
| 2021/0374510 A1 | 12/2021 | Liu et al. |
| 2021/0374511 A1 | 12/2021 | Liu et al. |
| 2022/0004884 A1* | 1/2022 | Guo .................. G06N 3/04 |

FOREIGN PATENT DOCUMENTS

| | | |
|---|---|---|
| CN | 1851668 A | 10/2006 |
| CN | 101572829 A | 11/2009 |
| CN | 102270042 A | 12/2011 |
| CN | 102404673 A | 4/2012 |
| CN | 102684701 A | 9/2012 |
| CN | 102761509 A | 10/2012 |
| CN | 102789413 A | 11/2012 |
| CN | 102903089 A | 1/2013 |
| CN | 102981854 A | 3/2013 |
| CN | 103152673 A | 6/2013 |
| CN | 104914977 A | 9/2015 |
| CN | 105389158 A | 3/2016 |
| CN | 103534664 A | 8/2016 |
| CN | 105893419 A | 8/2016 |
| CN | 105978611 A | 9/2016 |
| CN | 106156310 A | 11/2016 |
| CN | 106354568 A | 1/2017 |
| CN | 106406812 A | 2/2017 |
| CN | 106469291 A | 3/2017 |
| CN | 106485316 A | 3/2017 |
| CN | 106502626 A | 3/2017 |
| CN | 106570559 A | 4/2017 |
| CN | 106650922 A | 5/2017 |
| CN | 106814639 A | 6/2017 |
| CN | 106951587 A | 7/2017 |
| CN | 106951962 A1 | 7/2017 |
| CN | 106997236 A | 8/2017 |
| CN | 107003988 A | 8/2017 |
| CN | 107025629 A | 8/2017 |
| CN | 107368174 A | 11/2017 |
| CN | 107451654 A | 12/2017 |
| CN | 107451658 A | 12/2017 |
| CN | 107608715 A | 1/2018 |
| CN | 107644254 A | 1/2018 |
| CN | 107688855 A | 2/2018 |
| CN | 107797913 A | 3/2018 |
| CN | 108053028 A | 5/2018 |
| CN | 104899641 A | 7/2018 |
| CN | 108337000 A | 7/2018 |
| CN | 108510067 A | 9/2018 |
| CN | 108717570 A | 10/2018 |
| CN | 109062540 A | 12/2018 |
| CN | 109063820 A | 12/2018 |
| CN | 109146057 A | 1/2019 |
| CN | 109214509 A | 1/2019 |
| CN | 109389219 A | 2/2019 |
| CN | 109472353 A | 3/2019 |
| CN | 109800877 A | 5/2019 |
| CN | 109902745 A | 6/2019 |
| CN | 109934331 A | 6/2019 |
| CN | 109993296 A | 7/2019 |
| CN | 110059733 A | 7/2019 |
| CN | 11055450 A | 12/2019 |
| CN | 110780845 A | 2/2020 |
| EP | 0 789 296 A1 | 8/1997 |
| EP | 2 703 945 A2 | 3/2014 |
| EP | 3 106 997 A2 | 12/2016 |
| EP | 3 407 268 A1 | 11/2018 |
| JP | 03-075860 A | 8/1989 |
| JP | H09-265379 A | 10/1997 |
| JP | 2009-134433 A | 8/2012 |
| JP | 2013-514570 A | 4/2013 |
| JP | 2014-199464 A | 10/2014 |
| JP | 2015-176158 A | 10/2015 |
| JP | 2018-26114 A | 2/2018 |
| JP | 2019-519852 A | 7/2019 |
| WO | 2008153194 A1 | 12/2008 |
| WO | 2016186823 A1 | 11/2016 |
| WO | 2017185412 A1 | 11/2017 |

OTHER PUBLICATIONS

Yi Yang et al: "Deploy Large-Scale Deep Neural Networks in Resource Constrained IoT Devices with Local Quantization Region", arxiv.org, Cornell University Library, 201 Olin Library Cornell University Ithaca, NY 14853, May 24, 2018 (May 24, 2018), XP081234517.

Gysel Philipp et al: "Ristretto: A Framework for Empirical Study of Resource-Efficient Inference in Convolutional Neural Networks", IEEE Transactions on Neural Networks and Learning Systems, IEEE, Piscataway, NJ, USA, vol. 29, No. 11, Nov. 1, 2018 (Nov. 1, 2018), pp. 5784-5789, XP011692881, ISSN: 2162-237X, DOI: 10.1109/TNNLS.2018.2808319 [retrieved on Oct. 17, 2018].

Chen, T., et al., "DianNao: A Small-Footprint High-Throughput Accelerator for Ubiquitous Machine-Learning," ASPLOS '14 Proceedings of the 19th international conference on Architectural support for programming languages and operating systems, pp. 269-284, Salt Lake City, Utah, USA—Mar. 1, 2014; available: https://dl.acm.org/citation.cfm?id=2541967.

Chen, T., et al., "A Small-Footprint Accelerator for Large-Scale Neural Networks," ACM Transactions on Computer Systems (TOCS), vol. 33, Issue 2,May 1, 2015, Article No. 6, ACM New York, NY, USA; available: https://dl.acm.org/citation.cfm?id=2701417.

Chen, Y., et al., "DaDianNao: A Machine-Learning Supercomputer," MICRO-47 Proceedings of the 47th Annual IEEE/ACM International Symposium on Microarchitecture, pp. 609-622, Cambridge, United Kingdom—Dec. 13, 2014; available: https://dl.acm.org/citation.cfm?id=2742217.

Luo, T., et al., "DaDianNao: A Neural Network Supercomputer," Published in: IEEE Transactions on Computers, vol. 66 , Issue: 1, pp. 73-88, Date of Publication: May 30, 2016; available: https://ieeexplore.ieee.org/document/7480791.

Liu, D., et al., "PuDianNao: A Polyvalent Machine Learning Accelerator," ASPLOS '15 Proceedings of the Twentieth International Conference on Architectural Support for Programming Languages and Operating Systems,pp. 369-381, Istanbul, Turkey—Mar. 14, 2015; available: https://dl.acm.org/citation.cfm?id=2694358.

Du, Z., et al., "ShiDianNao: Shifting Vision Processing Closer to the Sensor," ISCA '15 Proceedings of the 42nd Annual International Symposium on Computer Architecture, pp. 92-104, Portland, Oregon—Jun. 13, 2015 available: https://dl.acm.org/citation.cfm?id=2750389.

Du, Z., et al., "An Accelerator for High Efficient Vision Processing," Published in: IEEE Transactions on Computer-Aided Design of Integrated Circuits and Systems, vol. 36 , Issue: 2, Jun. 22, 2016, pp. 227-240; available: https://ieeexplore.ieee.org/document/7497562.

Liu, S., et al., "Cambricon: An Instruction Set Architecture for Neural Networks," 2016 ACM/IEEE 43rd Annual International Symposium on Computer Architecture (ISCA), Seoul, South Korea, Jun. 18, 2016; available: https://ieeexplore.ieee.org/document/7551409.

Zhang, S. et al., "Cambricon-X: An Accelerator for Sparse Neural Networks," Published in: 2016 49th Annual IEEE/ACM International Symposium on Microarchitecture (MICRO), Taipei, Taiwan, Oct. 15, 2016; available: https://ieeexplore.ieee.org/document/7783723.

Chen, Y., et al., "DianNao Family: Energy-Efficient Hardware Accelerators for Machine Learning," Communications of the ACM, vol. 59 Issue 11, Oct. 28, 2016, pp. 105-112, ACM New York, NY, USA; available: https://dl.acm.org/citation.cfm?id=2996864.

vivienne Sze et al., "Efficient Processing of Deep Neural Networks: A Tutorial and Survey", arxiv.org, Cornell University Library, 201 Olin Library Cornell University Ithaca, NY 14853, Mar. 27, 2017 (Mar. 27, 2017), XP080759895, DOI: 10.1109/JPROC.2017. 2761740.

Liu Shaoli et al., "Cambricon: An Instruction Set Architecture for Neural Networks", 2013 21st International Conference on Program Comprehension (ICPC); [International Symposium on Computer Architecture.(ISCA)], IEEE, US, Jun. 18, 2016 (Jun. 18, 2016), pp. 393-405, XP032950675, ISSN: 1063-6897, DOI: 10.1109/ISCA. 2016.42 ISBN: 978-0-7695-3174-8 [retrieved on Aug. 24, 2016].

(56) References Cited

OTHER PUBLICATIONS

IBM, "PowerPC Microprocessor Family: Vector/SIMD Multimedia Extension Technology Programming Environments Manual Programming Environments Manual", Aug. 22, 2005 (Aug. 22, 2005), pp. 170-171, XP055673033, Retrieved from the Internet: URL:http://math-atlas.sourceforge.net/devel/assembly/ vector_simd_pem. ppc. 2005AUG23.pdf [retrieved on Mar. 3, 2020].

Sumod Mohan, "Accuracy and Multi-Core Performance of Machine Learning Algorithms for Handwritten Character Recognition", Aug. 1, 2009 (Aug. 1, 2009), XP055673941, Retrieved from the Internet: URL:https://tigerprints.clemson.edu/cgi/viewcontent.cgi? article=1634&context=all theses retrieved on Mar. 5, 2020].

European Patent Office, Extended European Search Report for European Application No. 19212749.6 dated Mar. 18, 2020.
European Patent Office, Extended European Search Report for European Application No. 19212750.4 dated Mar. 18, 2020.
European Patent Office, Extended European Search Report for European Application No. 19212751.2 dated Mar. 18, 2020.
European Patent Office, Extended European Search Report for European Application No. 19212752.0 dated Mar. 18, 2020.
European Patent Office, Extended European Search Report for European Application No. 19214004.4 dated Mar. 18, 2020.
European Patent Office, Extended European Search Report for European Application No. 19213389.0 dated Mar. 18, 2020.
European Patent Office, Extended European Search Report for European Application No. 19212753.8 dated Mar. 18, 2020.
European Patent Office, Extended European Search Report for European Application No. 19212754.6 dated Mar. 18, 2020.
European Patent Office, Extended European Search Report for European Application No. 19212755.3 dated Mar. 18, 2020.
European Patent Office, Extended European Search Report for European Application No. 19212756.1 dated Mar. 18, 2020.
European Patent Office, Extended European Search Report for European Application No. 18906652.6 dated Mar. 18, 2020.
European Patent Office, Extended European Search Report for European Application No. 19212746.2 dated Mar. 18, 2020.

Kalathingal Sajith et al., "Dynamic Inter-Thread Vectorization Architecture: Extracting OLP from TLP", 2016 28th International Symposium on Computer Architecture and High Performance Computing (SBAC-PAD), IEEE, Oct. 26, 2016, pp. 18-25, XP033028005, DOI: 10.1109/SBAC-PAD.2016.11.

Li et al., "Using Artificial Neural Network for Predicting Thread Partitioning in Speculative Multithreading", IEEE, 2015, pp. 823-826.

Na et al., "Speeding up Convolutional Neural Network Training with Dynamic Precision Scaling and Flexible MiultiplierAccumulator", Section 2 Proposed Approach: Concept, ACM, Aug. 8-10, 2016, 6 pages.

Hanlon, Jamie, "Why is so much memory needed for deep neural networks?", URL: https://www.graphcore.ai/posts/why-is-so-much-memory-needed-for-deep-neural-networks, Jan. 31, 2017, 6 pages.

Anonymous, "Control unit—Wikipedia", May 8, 2017 (May 8, 2017), XP055673879,Retrieved from the Internet: URL: https://web.archive.org/web/20170508110348/https://en.wikipedia.org/ wiki/Control unit [retrieved on Mar. 5, 2020].

Joel Emer et al., "DNN Accelerator Architectures", CICS/MTL Tutorial, Jan. 1, 2017 (Jan. 1, 2017), XP055672691, Retrieved from the Internet: URL:https://www.rle.mit.edu/eems/wp-content/uploads/2017/031Tutorial-on- JNN-4-of-5-DNN-Accelerator-Architectures.pdf [retrieved on Mar. 2, 2020].

Chen Yu-Hsin et al., "Eyeriss: An Energy-Efficient Reconfigurable Accelerator for Deep Convolutional Neural getworks", IEEE Journal of Solid-State Circuits, IEEE, USA, vol. 52, No. 1, Jan. 1, 2017 (Jan. 1, 2017), pp. 127-138, XP011638633, ISSN: 0018-9200, DOI: 10.1109/JSSC.2016.2616357 [retrieved on Jan. 9, 2017].

Pedro O. Domingos, et al., "An Efficient and Scalable Architecture for Neural Networks With Backpropagation Learning" Proceedings/ 2005 International Conference on Field Programmable Logic and Applications {FPL): Tampere Hall, Tampere, Finland, Jan. 1, 2005, pp. 89-94, XP055606447, Piscataway, NJ. DOI: 10.1109/FPL.2005.1515704 ISBN: 978-0-7803-9362-2.

Hsu Jeremy, "For sale: deep learning [News]", IEEE Spectrum, IEEE Inc. New York, US, vol. 53, No. 8, Aug. 1, 2016 (Aug. 1, 2016), pp. 12-13, XP011620787, ISSN: 0018-9235, DOI: 10.1109/MSPEC.2016.7524158 [retrieved on Jul. 27, 2016].

Song Mingcong et al., "In-Situ AI: Towards Autonomous and Incremental Deep Learning for IoT Systems", 2018 IEEE International Symposium on High Performance Computer Architecture (HPCA),IEEE, Feb. 24, 2018 (Feb. 24, 2018), pp. 92-103, XP033341941, DOI: 10.1109/HPCA.2018.00018 [retrieved on Mar. 27, 2018].

Kallam Suresh et al., "Evaluating the Performance of Deep Learning Techniques on Classification Using Tensor Flow Application", 2018 International Conference on Advances in Computing and Communication Engineering (ICACCE). IEEE, Jun. 22, 2018 (Jun. 22, 2018), pp. 331-335, XP033389370, DOI: 10.1109/ICACCE. 2018.844167 4 [retrieved on Aug. 20, 2018].

Olariu Cristian et al., "A Cloud-Based AI Framework for Machine Learning Orchestration: A "Driving or Not-Driving" Case-Study for Self-Driving Cars", 2019 IEEE Intelligent Vehicles Symposium (IV). IEEE, Jun. 9, 2019 (Jun. 9, 2019), pp. 1715-1722, XP033606002, DOI: 10.1109/IVS.2019.8813870 [retrieved on Aug. 26, 2019].

European Patent Office, extended European search report for Application No. 19216754.2 dated May 8, 2020.

Extended European Search Report for EP Application No. 19214324.6 dated Oct. 1, 2020.

International Searching Authority, International Search Report for PCT Application No. PCT/CN2019/093144 dated Oct. 9, 2019.

Extended European Search Report for Application No. 19215861.6 dated May 15, 2020.

Extended European Search Report for Application No. 19215862.4 dated May 15, 2020.

Sumina Yamashita, et al., "A Method to create illustrate images using DCGAN," JISJ SIG Technical Report, vol. 2017-MPS-112 No. 16, Feb. 27, 2017; translation of abstract included.

* cited by examiner

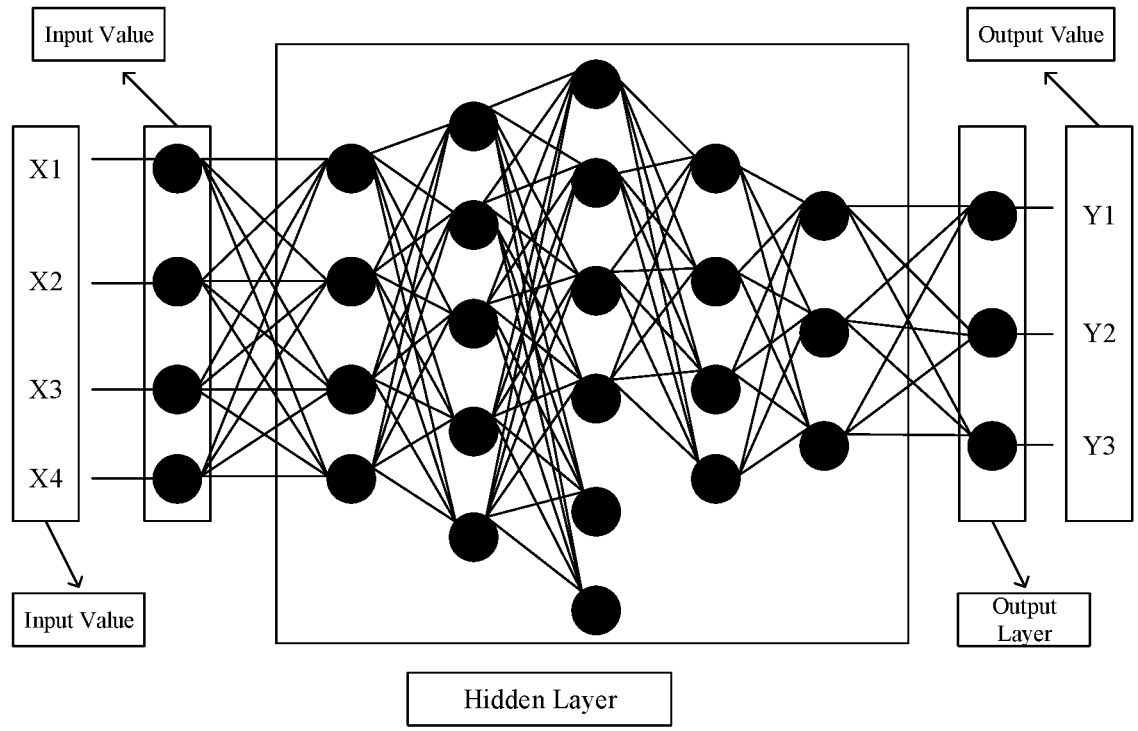

FIG. 1

| Obtaining an analyzing result of each type of the data to be quantized; in which the data to be quantized includes at least one type of neurons, weights, gradients, and biases of the neural network. | 201 |

| Determining a corresponding quantization parameter according to the analyzing result of each type of data to be quantized and data bit width; in which the quantization parameter is used by an artificial intelligence processor to perform corresponding quantization on data involved in a process of neural network operation. | 202 |

FIG. 2

NEURAL NETWORK QUANTIZATION PARAMETER DETERMINATION METHOD AND RELATED PRODUCTS

RELATED APPLICATIONS

This application is a continuation of U.S. application Ser. No. 16/622,541, filed Dec. 13, 2019, which is a national stage application of PCT/CN2019/106754, filed Sep. 19, 2019. The PCT/CN2019/106754 application claims the benefit and priority of Chinese Patent Application No. 201910570125.0 with the title of "Neural Network Quantization Parameter Determination Method and Related Products" filed on Jun. 27, 2019. The PCT/CN2019/106754 also claims the benefit and priority of Chinese Patent Application No. 201910505239.7 with the title of "Neural Network Quantization Method, Device, and Related Products" filed on Jun. 12, 2019. The PCT/CN2019/106754 further claims the benefit and priority of Chinese Patent Application No. 201910528537.8 with the title of "Quantization Parameter Adjustment Method, Device, and Related Products" filed on Jun. 18, 2019. The PCT/CN2019/106754 further claims the benefit and priority of Chinese Patent Application No. 201910515355.7 with the title of "Neural Network Quantization Parameter Determination Method and Related Products" filed on Jun. 14, 2019. The content of all the applications mentioned above are incorporated herein in their entireties.

TECHNICAL FIELD

The examples of the present disclosure relates to a neural network quantization parameter determination method and related product.

BACKGROUND ART

A neural network (NN) is a mathematical or computational model that imitates structures and functions of a biological neural network. By training sample data, the neural network continuously revises weights and thresholds of the network to reduce an error function along a direction of negative gradient and approach an expected output. The neural network is a widely used recognition and classification model, which is mostly used for function approximation, model recognition and classification, data compression, time series prediction, and the like.

In practical applications, the neural network usually uses data of 32 Bit. The data in the existing neural network occupies a number of bits, which requires a large storage space and high processing bandwidth in spite of ensuring precision, thereby increasing the cost.

SUMMARY

The present disclosure provides a neural network quantization parameter determination method and related product to solve the above technical problem.

The present disclosure provides a neural network quantization parameter determination method including:

obtaining an analyzing result of each type of the data to be quantized, in which the data to be quantized includes at least one type of neurons, weights, gradients, and biases of the neural network; and determining a corresponding quantization parameter according to the analyzing result of each type of data to be quantized and data bit width, in which the quantization parameter is used by an artificial intelligence processor to perform corresponding quantization on data involved in a process of neural network operation.

The present disclosure provides a neural network quantization parameter determination device including a memory and a processor, in which the memory stores a computer program that can run on the processor, and steps of the above method are implemented when the processor executes the computer program.

The present disclosure provides a computer readable storage medium, on which a computer program is stored, and steps of the above method are implemented when the processor executes the computer program.

The present disclosure provides a neural network quantization parameter determination device, in which the device includes:

an analyzing result obtaining unit configured to obtain an analyzing result of each type of the data to be quantized, in which the data to be quantized includes at least one type of neurons, weights, gradients, and biases of the neural network; and a quantization parameter determination unit configured to determine a corresponding quantization parameter according to the analyzing result of each type of data to be quantized and data bit width, in which the quantization parameter is used by an artificial intelligence processor to perform corresponding quantization on data involved in a process of neural network operation.

In the process of neural network operation, a quantization parameter is determined during quantization by using technical schemes in the present disclosure. The quantization parameter is used by an artificial intelligence processor to quantize data involved in the process of neural network operation and convert high-precision data into low-precision fixed-point data, which may reduce storage space of data involved in the process of neural network operation. For example, a conversion of float32 to fix8 may reduce a model parameter by four times. Smaller data storage space enables neural network deployment to occupy smaller space, thus on-chip memory of an artificial intelligence processor chip may store more data, which may reduce memory access data in the artificial intelligence processor chip and improve computing performance.

BRIEF DESCRIPTION OF THE DRAWINGS

To describe technical schemes in examples of the present disclosure more clearly, accompanied drawings in examples of the present disclosure will be briefly described hereinafter. Apparently, the described accompanied drawings below merely show examples of the present disclosure and are not intended to be considered as limitations of the present disclosure.

FIG. 1 is a schematic structural diagram of a neural network according to an example of the present disclosure;

FIG. 2 is a flow chart illustrating a neural network quantization parameter determination method according to an example of the present disclosure;

DETAILED DESCRIPTION OF THE EXAMPLES

Figure 3:
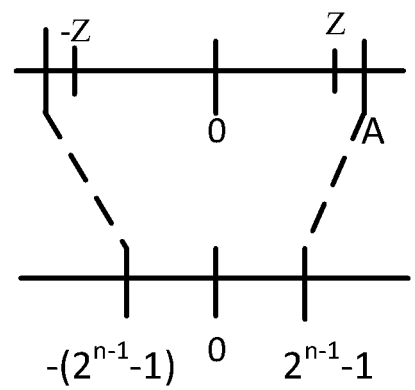
FIG. 3 is a schematic diagram of a symmetrical fixed-point data representation according to an example of the present disclosure.

Technical schemes in examples of the present disclosure will be described clearly and completely hereinafter with reference to the accompanied drawings in examples of the present disclosure. Apparently, the described examples are merely some rather than all examples of the present disclosure. All other examples obtained by those of ordinary skill in the art based on the examples of the present disclosure without creative efforts shall fall within the protection scope of the present disclosure.

It should be understood that the terms such as "first", "second", "third", "fourth" and the like used in the specification, the claims, and the accompanied drawings of the present disclosure are used for distinguishing between different objects rather than describing a particular order. The terms "include" and "comprise" used in the specification and claims are intended to indicate existence of the described features, whole body, steps, operations, elements, and/or components, but do not exclude the existence or addition of one or more other features, whole body, steps, operations, elements, components, and/or collections thereof.

It should also be understood that the terms used in the specification of the present disclosure are merely intended to describe specific examples rather than to limit the present disclosure. As used in the specification and claims of the present disclosure, singular forms of "a", "one", and "the" are intended to include plural forms unless the context clearly indicates other circumstances. It should be further understood that the term "and/or" used in the specification and claims of the present disclosure refers to any combination and all possible combinations of one or more listed relevant items.

As used in the specification and claims of the present disclosure, the term "if" may be interpreted as "when", "once", "in response to determining", or "in response to detecting" according to the context. Similarly, phrases such as "if . . . is determined" or "if [the described conditions or events] are detected" may be interpreted as "once . . . is determined", "in response to determining", "once [the described conditions or events] are detected", or "in response to detecting [the described conditions or events]".

Definitions of Technical Terms

Floating-point number: According to the IEEE floating-point standard, a floating-point number is a number represented in a form of $V=(-1)^{sign}*mantissa*2^E$, in which "sign" refers to a sign bit (0 refers to a positive number and 1 refers to a negative number); E refers to an exponent, which means to weight a floating-point number and the weight is an $E^{th}$ power of 2 (possibly a negative power); and mantissa refers to a mantissa, which is a binary fraction whose range is 1~2-ε or 0-ε. Representation of a floating-point number in a computer is divided into three fields, which are encoded separately:

(1) a single sign bit s directly encodes a sign s;

(2) a k-bit exponent field encodes the exponent, exp=e(k-1) . . . e(1)e(0); and (3) an n-bit decimal number field mantissa encodes the mantissa, but encoding results depend on whether results in the exponent stage are all 0.

Fixed-point number: A fixed-point number consists of three parts: a shared exponent, a sign bit, and a mantissa. Here the shared exponent refers to an exponent that is shared within a set of real numbers that need to be quantized; the sign bit determines whether a fixed-point number is positive or negative; and the mantissa determines the number of valid digits of a fixed-point number, which is also known as precision. Taking an 8-bit fixed-point number as an example, the numerical computing method is as follows:

$$value=(-1)^{sign} \times (mantissa) \times 2^{(exponent-127)}$$

Binary fraction: Any decimal number can be represented by a formula $\Sigma j*10^i$. For example, a decimal number 12.34 can be represented by the formula 1 as follows: $12.34=1*10^1+2*10^0+3*10^{-1}+4*10^{-2}$, in which a left side of a decimal point is a positive power of 10, and a right side of the decimal point is a negative power of 10. Similarly, a binary fraction can also be represented in this way, in which the left side of the decimal point is a positive power of 2 and the right side of the decimal point is a negative power of 2. For example, a decimal number 5.75 can be represented as $5.75=1*2^2+0*2^1+1*2^0+1*2^{-1}+1*2^{-2}$, so 5.75 can be represented as a binary fraction 101.11.

Overflow: In a fixed-point computation unit, representation of a number has a certain range. In a computation process, if a size of a number exceeds the representation range of a fixed-point number, it is called "overflow".

KL divergence (Kullback-Leibler divergence): It is also known as relative entropy, information divergence, and information gain. KL divergence is an asymmetrical measure of difference between two probability distributions P and Q. KL divergence is used to measure the average number of extra bits required to encode samples from P by using encoding based on Q. Typically, P represents actual distribution of data, Q represents theoretical distribution of data, model distribution of data, or approximate distribution of P.

Data bit width: The number of bits used to represent data.

Quantization: a process of converting high-precision numbers represented by 32 bits or 64 bits into fixed-point numbers that occupy less memory space, which may cause certain loss in precision.

Descriptions of a neural network quantization parameter determination method and related product will be illustrated in detail with reference to the accompanied drawings.

A neural network (NN) is a mathematical model which imitates structures and functions of a biological neural network, and is computed by a large number of connected neurons. Therefore, a neural network is a computational model, which comprises a large number of connected nodes (or called "neurons"). Each node represents a specific output function called activation function. A connection between each two neurons represents a weighted value that passes through the connection signal, which is called a weight. The weight can be viewed as "memory" of a neural network. An output of a neural network varies according to different connection methods between neurons, different weights, and different activation functions. A neuron is a basic unit of the neural network, which obtains a certain number of inputs and a bias. The certain number of inputs and the bias are multiplied by a weight when a signal (value) arrives. The connection refers to connecting one neuron to another neuron in another layer or the same layer, and the connection is accompanied by an associated weight. In addition, the bias is an extra input of the neuron, which is always 1 and has its own connection weight. This ensures that the neuron can be activated even if all inputs are empty (all 0).

In applications, if no non-linear function is applied to the neuron in the neural network, the neural network is only a linear function and is not powerful than a single neuron. If an output result of a neural network is between 0 and 1, for example, in a case of cat-dog identification, an output close to 0 can be regarded as a cat and an output close to 1 can be regarded as a dog, an activation function such as a sigmoid activation function is introduced into the neural network to realize the cat-dog identification. A return value of the activation function is a number between 0 and 1. Therefore, the activation function is configured to introduce non-linearity into the neural network, which may narrow down the range of a neural network operation result. In fact, how the activation function is represented is not important, and what is important is to parameterize a non-linear function by some weights, thus the non-linear function may be changed by changing the weights.

FIG. 1 is a schematic structural diagram of a neural network. The neural network shown in FIG. 1 contains three layers: an input layer, a hidden layer, and an output layer. The hidden layer shown in FIG. 1 contains five layers. A leftmost layer in the neural network is called the input layer and a neuron in the input layer is called an input neuron. As a first layer in the neural network, the input layer receives input signals (values) and transmits the signals (values) to a next layer. The input layer generally does not perform operations on the input signals (values), and has no associated weight or bias. The neural network shown in FIG. 1 contains four input signals: x1, x2, x3, and x4.

The hidden layer includes neurons (nodes). The neural network shown in FIG. 1 contains five hidden layers. A first hidden layer contains four neurons (nodes), a second hidden layer contains five neurons, a third hidden layer contains six neurons, a fourth hidden layer contains four neurons, and a fifth hidden layer contains three neurons. Finally, the hidden layer transmits operation values of the neurons to the output layer. In the neural network shown in FIG. 1, each of the neurons in the five hidden layers is fully connected, and each of the neurons in each hidden layer is connected with each neuron in the next layer. It should be noted that in some neural networks, hidden layers may not be fully connected.

A rightmost layer of the neural network shown in FIG. 1 is called the output layer, and the neuron in the output layer is called an output neuron. The output layer receives the output from the last hidden layer. In the neural network shown in FIG. 1, the output layer contains three neurons and three output signals (y1, y2, and y3).

In practical applications, plenty of sample data (including input and output) are given in advance to train an initial neural network. After training, a trained neural network is obtained, and the trained neural network may give a right output for the input in real environment in the future.

Before the discussion of neural network training, a loss function needs to be defined. A loss function is a function measuring performance of a neural network when the neural network performs a specific task. In some example, the loss function may be obtained as follows: transmitting each sample data along the neural network in the process of training a certain neural network to obtain an output value, performing subtraction on the output value and an expected value to obtain a difference, and then squaring the difference. The loss function obtained in the manner is the difference between the expected value and the true value. The purpose of training a neural network is to reduce the value of the loss function. In some examples, the loss function can be represented as:

$$L(y, \hat{y}) = \frac{1}{m} \sum_{i=1}^{m} (y_i - \hat{y}_i)^2$$

In the formula, y represents an expected value, $\hat{y}$ represents an actual result obtained by each sample data in a sample data set transmitting through the neural network, t represents an index of each sample data in the sample data set, $L(y,\hat{y})$ represents the difference between the expected value y and the actual result $\hat{y}$, and m represents the number of sample data in the sample data set. Taking the cat-dog identification as an example, in a data set consisting of pictures of cats and dogs, a corresponding label of a picture of dog is 1 and a corresponding label of a picture of cat is 0. The label corresponds to the expected value y in above formula. The purpose of transmitting each sample image to the neural network is to obtain a recognition result through the neural network. In order to calculate the loss function, each sample image in the sample data set must be traversed to obtain the actual result $\hat{y}$ corresponding to each sample image, and then calculate the loss function according to the above definition. The value of the loss function being large means that the training of the neural network has not been finished and the weight needs to be adjusted.

At the beginning of neural network training, the weight needs to be initialized randomly. It is apparent that an initialized neural network may not provide a good result. In the training process, if starting from an initialized neural network, a network with high precision may be obtained through training.

The training process of a neural network comprises two stages. The first stage is to perform a forward processing on a signal, which means to transmit the signal from the input layer to the output layer through the hidden layer. The second stage is to perform back propagation on a gradient, which means to propagate the gradient from the output layer to the hidden layer, and finally to the input layer, and sequentially adjust weights and biases of each layer in the neural network according to the gradient.

In the process of forward processing, an input value is input into the input layer in the neural network and an output (called a predicted value) is obtained from the output layer in the neural network. When the input value is input into the input layer in the neural network, the input layer does not perform any operation. In the hidden layer, the second hidden layer obtains a predicted intermediate result value from the first hidden layer to perform a computation operation and an activation operation, and then transmits the obtained predicted intermediate result value to the next hidden layer. The same operations are performed in the following layers to obtain the output value in the output layer in the neural network.

An output value called a predicted value is obtained after the forward processing. In order to calculate the error produced in the forward process, the predicted value is compared with an actual output value to obtain a corresponding error. A chain rule of calculus is used in the back propagation. In the chain rule, derivatives of errors corresponding to the weights of the last layer in the neural network are calculated first. The derivatives are called gradients, which are then used to calculate the gradients of the penultimate layer in the neural network. The process is repeated until the gradient corresponding to each weight in the neural network is obtained. Finally, the corresponding gradient is subtracted from each weight in the neural network, then the weight is updated once, to reduce errors.

For a neural network, fine-tuning refers to loading a trained neural network. The process of fine-tuning also comprises two stages, which are the same as those of training. The first stage is to perform the forward processing on a signal, and the second stage is to perform the back propagation on a gradient to update weights in the trained neural network. The difference between training and fine-tuning is that training refers to randomly processing an initialized neural network and starts from the beginning, while fine-tuning does not start with a randomly selected neural network.

In the process of training or fine-tuning a neural network, weights in the neural network are updated based on gradients once every time the neural network performs a forward processing on a signal and performs a corresponding back propagation on an error, and the whole process is called an iteration. In order to obtain a neural network with expected precision, a large sample data set is needed in the training process, but it is impossible to input the entire sample data set into a computer at once. Therefore, in order to solve the problem, the sample data set needs to be divided into multiple blocks and then each block of the sample data set is passed to the computer. After the forward processing is performed on each block of the sample data set, the weights in the neural network are correspondingly updated once. When the neural network performs a forward processing on a complete sample data set and returns a weight update correspondingly, the process is called an epoch. In practice, it is not enough to perform forward processing on a complete data set in the neural network only once. It is necessary to transmit the complete data set in the same neural network multiple times, which means that multiple epochs are needed to obtain a neural network with expected precision.

In the process of training or fine-tuning a neural network, it is expected to have faster speed and higher precision. Since data in the neural network is represented in a high-precision data format such as floating-point numbers, all the data involved in the process of training or fine-tuning is in the high-precision data format and then the trained neural network is quantized. For example, when quantized objects are weights of a whole neural network and the quantized weights are 8-bit fixed-point numbers, since a neural network usually contains millions of connections, almost all the space is occupied by weights that are connected with neurons. The weights are different floating-point numbers and the weights of each layer tend to be normally distributed in a certain interval, such as (−3.0, 3.0). A maximum value and a minimum value corresponding to the weights of each layer in the neural network are stored, and the value of each floating-point number is represented by an 8-bit fixed-point number. The interval within the range of the maximum value and the minimum value is linearly divided into 256 quantization intervals, in which each quantization interval is represented by an 8-bit fixed-point number. For example, in an interval of (−3.0, 3.0), byte 0 represents −3.0 and byte 255 represents 3.0. Similarly, byte 128 represents 0.

For data represented in a high-precision data format such as a floating-point number, based on rules of computation representation of floating-point and fixed-point numbers according to a computer architecture, for a fixed-point computation and a floating-point computation of the same length, a floating-point computation model is more complex and needs more logic devices to build a floating-point computation unit, which means that a volume of the floating-point computation unit is larger than the volume of a fixed-point computation unit. Moreover, the floating-point computation unit needs to consume more resources to process, so that a gap of power consumption between the fixed-point computation unit and the floating-point computation unit is usually an order of magnitude. The floating-point computation unit occupies many times more chip area and consumes many times more power than the fixed-point computation unit.

However, the floating-point computation has its own advantages. Firstly, although the fixed-point computation is straightforward, a fixed position of decimals determines an integer part and a decimal part with a fixed number of bits, which may be inconvenient to simultaneously represent a large number or a small number, and may lead to overflow.

In addition, when an artificial intelligence processor chip is used for training or fine-tuning, the floating-point computation unit may be more suitable than the fixed-point computation unit, because in a neural network with supervised learning, only the floating-point computation unit is capable of recording and capturing tiny increments in training. Therefore, how computing capability of chip training can be improved without increasing the artificial intelligence chip area and power consumption is an urgent problem to be solved.

Based on practice, training with low bit-width fixed-point numbers requires fixed-point numbers greater than 8-bit to perform the back propagation on gradients, which means that the process of training with low bit-width fixed-point numbers may be complex. Therefore, how a floating-point computation unit can be replaced with a fixed-point computation unit to achieve fast speed of the fixed-point computation and how peak computation power of an artificial intelligence processor chip can be improved while the precision of floating-point computation is maintained are technical problems the specification intends to address.

As described above, high tolerance for input noise is a feature of a neural network. When identifying an object in a picture, the neural network may be capable of ignoring primary noise and focusing on important similarities, which means that the neural network may be capable of taking the low-precision computation as a source of noise and still producing accurate prediction results in a numerical format that contains little information. It is necessary to find a universal data representation to perform low-precision training or fine-tuning, thus not only reducing data overflow, but also better representing data near 0 within the target interval.

Therefore, the data representation needs to have the adaptability to adjust within the training or fine-tuning process.

Based on the above description, FIG. 2 is a flow chart illustrating a neural network quantization parameter determination method according to an example of the present disclosure. The quantization parameter determined by the technical scheme shown in FIG. 2 is used for data representation of quantized data to determine quantized fixed-point numbers. The quantized fixed-point numbers are used for training, fine-tuning, or inference of a neural network. The method includes:

step 201: obtaining an analyzing result of each type of data to be quantized, in which the data to be quantized includes at least one type of neurons, weights, gradients, and biases of the neural network.

As mentioned above, in the process of training or fine-tuning a neural network, each layer in the neural network includes four types of data: neurons, weights, gradients, and biases. In the inference process, each layer in the neural network includes three types of data: neurons, weights, and biases, which are all represented in the high-precision data format. The floating-point numbers are taken as an example of high-precision data in the specification. It should be made clear that the floating-point numbers is only a partial, not exhaustive list, of examples. It should be noted that those of ordinary skill in the art may make modifications or variations within the spirit and principle of the disclosure, for example, high-precision data may be high bit-width fixed-point numbers with a wide range of representation, in which a lowest precision represented by the high bit-width fixed-point numbers is low enough, and the high bit-width fixed-point numbers may be converted into low bit-width fixed-point numbers by using the technical scheme in the present disclosure. However, as long as functions and technical effects realized by the modifications or variations are similar to those of the present disclosure, the modifications or variations shall fall within the scope of protection of the present disclosure.

No matter what a neural network structure it is, in the process of training or fine-tuning a neural network, the data to be quantized includes at least one type of neurons, weights, gradients, and biases of the neural network. In the inference process, the data to be quantized includes at least one type of neurons, weights, and biases of the neural network. If the data to be quantized are the weights, the data to be quantized may be all or part of the weights of a certain layer in the neural network. If the certain layer is a convolution layer, the data to be quantized may be all or part of the weights with a channel as a unit in the convolution layer, in which the channel refers to all or part of the channels of the convolution layer. It should be noted that only the convolution layer has a concept of channels. In the convolution layer, only the weights are quantized layer by layer in a channel manner.

The following example is that the data to be quantized are the neurons and the weights of a target layer in the neural network, and the technical scheme is described in detail below. In this step, the neurons and the weights of each layer in the target layer are analyzed respectively to obtain a maximum value and a minimum value of each type of the data to be quantized, and a maximum absolute value of each type of the data to be quantized may also be obtained. The target layer, as a layer needed to be quantized in the neural network, may be one layer or multiple layers. Taking one layer as a unit, the maximum absolute value of the data to be quantized may be determined by the maximum value and the minimum value of each type of the data to be quantized.

The maximum absolute value of each type of the data to be quantized may be further obtained by calculating the absolute value of each type of the data to be quantized to obtain results and then traversing the results.

In practical applications, a reason why obtaining the maximum absolute value of each type of the data to be quantized according to the maximum value and the minimum value of each type of the data to be quantized is that, during quantization, the maximum value and the minimum value corresponding to the data to be quantized of each layer in the target layer are normally stored, which means that there is no need to consume more resources to calculate the absolute value of the data to be quantized and the maximum absolute value can be obtained directly based on the stored maximum and minimum value corresponding to the data to be quantized.

Step 202: determining a corresponding quantization parameter by using the analyzing result of each type of the data to be quantized and a data bit width. The quantization parameter is used by an artificial intelligence processor to perform corresponding quantization on data involved in a process of neural network operation.

In this step, the quantization parameter may include the following six situations.

Situation one: the quantization parameter is a point position parameter s. In the situation, the following formula (1) may be used to quantize the data to obtain quantized data $I_x$:

$$I_x = \text{round}\left(\frac{F_x}{2^s}\right) \quad (1)$$

In the formula, s refers to the point position parameter; $I_x$ refers to an n-bit binary representation value of data x after quantization; $F_x$ refers to a floating-point value of the data x before quantization; and round refers to a rounding calculation, in which it should be noted that round is not limited to a round calculation and may refer to performing other calculations such as a ceiling calculation, a flooring calculation, a fix calculation, and the like to replace the round calculation in formula (1). In the situation, a maximum value A of a floating-point number may be represented by an n-bit fixed-point number as $2^s(2^{n-1}-1)$, then a maximum value in a number field of the data to be quantized may be represented by an n-bit fixed-point number as $2^s(2^{n-1}-1)$, and a minimum value in the number field of the data to be quantized may be represented by an n-bit fixed-point number as $-2^s(2^{n-1}-1)$. The formula (1) shows that when the data to be quantized is quantized by using the quantization parameter corresponding to the first situation, a quantization interval is $2^s$ and is marked as C.

If Z is set to be a maximum absolute value of all floating-point numbers in the number field of the data to be quantized, Z needs to be included in A and greater than $$\frac{A}{2},$$

so the following condition, formula (2), needs to be satisfied:

$$2^s(2^{n-1}-1) \geq Z > 2^{s-1}(2^{n-1}-1) \quad (2)$$

-continued

Therefore, $\log_2\left(\frac{Z}{2^{n-1}-1}\right) - 1 > s \geq \log_2\left(\frac{Z}{2^{n-1}-1}\right)$, then $$s = \text{ceil}\left(\log_2\left(\frac{Z}{2^{n1}-1}\right)\right), \text{ and}$$

$$A = 2^{\text{ceil}\left(\log_2 \frac{Z}{2^{n-1}-1}\right)}(2^{n-1}-1)$$

According to the formula (3), the n-bit binary representation value $I_x$ of the data x after quantization is inversely quantized to obtain inverse quantized data $\hat{F}_x$, in which the data format of the inverse quantized data $\hat{F}_x$ is the same as that of the corresponding data $F_x$ before quantization, both of which are floating-point numbers.

$$\hat{F}_x = \text{round}\left(\frac{F_x}{2^s}\right) \times 2^s \quad (3)$$

Situation two: the quantization parameter is a first scaling coefficient $f_1$. In the situation, the following formula (4) may be used to quantize the data to be quantized to obtain the quantized data $I_x$:

$$I_x = \text{round}\left(\frac{F_x}{f_1}\right) \quad (4)$$

In the formula, $f_1$ refers to the first scaling coefficient; $I_x$ refers to the n-bit binary representation value of the data x after quantization; $F_x$ refers to the floating-point value of the data x before quantization; and round refers to the rounding calculation, in which it should be noted that round is not limited to the round calculation and may refer to performing other rounding calculations such as the ceiling calculation, the flooring calculation, the fix calculation, and the like to replace the round calculation in the formula (4). The formula (4) shows that when the data to be quantized is quantized with the quantization parameter corresponding to the second situation, the quantization interval is $f_1$ and is marked as C.

For the first scaling coefficient $f_1$, a situation is that the point position parameter s is a known fixed value that does not change. Given $2^s = T$, in which T is a fixed value, a maximum value A of a floating-point number may be represented by an n-bit fixed-point number as $(2^{n-1}-1) \times T$. In the situation, the maximum value A depends on the data bit width n. Given that Z is a maximum absolute value of all numbers in the number field of the data to be quantized, $$f_1 = \frac{Z}{2^{n-1}-1} \text{ and } Z = (2^{n-1}-1) \times f_1.$$

The maximum value in the number field of the data to be quantized may be represented by an n-bit fixed-point number as $(2^{n-1}-1) \times f_1$, and the minimum value in the number field of the data to be quantized may be represented by an n-bit fixed-point number as $-(2^{n-1}-1) \times f_1$. In another situation, $2^s \times f_2$ is considered to be the first scaling coefficient $f_1$ as a whole in engineering applications, which means that the independent point position parameter s can be considered as not needed. In $2^s \times f_2$, $f_2$ refers to a second scaling coefficient. Given that Z is the maximum absolute value of all numbers in the number field of the data to be quantized, then $$f_1 = \frac{Z}{2^{n-1}-1} \text{ and } Z = (2^{n-1}-1) \times f_1.$$

The maximum value in the number field of the data to be quantized may be represented by an n-bit fixed-point number as $(2^{n-1}-1) \times f_1$, and the minimum value in the number field of the data to be quantized may be represented by an n-bit fixed-point number as $-(2^{n-1}-1) \times f_1$.

According to the formula (5), the n-bit binary representation value $I_x$ of the data x after quantization is inversely quantized to obtain the inverse quantized data $\hat{F}_x$, in which the data format of the inverse quantized data $\hat{F}_x$ is the same as that of the corresponding data $F_x$ before quantization, both of which are floating-point numbers.

$$\hat{F}_x = \text{round}\left(\frac{F_x}{f_1}\right) \times f_1 \quad (5)$$

Situation three: the quantization parameter is the point position parameter s and the second scaling coefficient $f_2$. In the situation, the following formula (6) may be used to obtain the quantized data $I_x$.

$$I_x = \text{round}\left(\frac{F_x}{2^s \times f_2}\right) \quad (6)$$

In the formula, s refers to the point position parameter, $f_2$ refers to the second scaling coefficient, and $$f_2 = \frac{Z}{2^s(2^{n-1}-1)};$$

$I_x$ refers to the n-bit binary representation value of the data x after quantization; $F_x$ refers to the floating-point value of the data x before quantization; and round refers to the rounding calculation. It should be noted that round is not limited to the round calculation and may refer to performing other rounding calculations such as the ceiling calculation, the flooring calculation, the fix calculation, and the like to replace the round calculation in the formula (6). The maximum value A in the number field of the data to be quantized may be represented by an n-bit fixed-point number as $2^s(2^{n-1}-1)$. The formula (6) shows that when the data to be quantized is quantized with the quantization parameter corresponding to the third situation, the quantization interval is $2^s \times f_2$ and is marked as C.

Given that Z is the maximum absolute value of all numbers in the number field of the data to be quantized, according to the formula (2), $$1 \geq \frac{Z}{2^s(2^{n-1}-1)} > \frac{1}{2},$$

which means that $$1 \geq \frac{Z}{A} > \frac{1}{2} \text{ and } 1 \geq f_2 > \frac{1}{2}.$$

When $$f_2 = \frac{Z}{2^s(2^{n-1}-1)} = \frac{Z}{A},$$

according to the formula (2), Z may not affect a precision representation. When $f_2=1$, according to the formula (6) and formula (1), $$s = ceil\left(\log_2\left(\frac{Z}{2^{n-1}-1}\right)\right).$$

The maximum value in the number field of the data to be quantized may be represented by an n-bit fixed-point number as $(2^{n-1}-1)\times 2^s \times f_2$, and the minimum value in the number field of the data to be quantized may be represented by an n-bit fixed-point number as $-(2^{n-1}-1)\times 2^s \times f_2$.

According to a formula (7), the n-bit binary representation value $I_x$ of the data x after quantization is inversely quantized to obtain the inverse quantized data $\hat{F}_x$. In the reverse quantization, the data format of the inverse quantized data $\hat{F}_x$ is the same as that of the corresponding data $F_x$ before quantization, both of which are floating-point numbers.

$$\hat{F}_x = round\left(\frac{F_x}{2^s \times f_2}\right) \times 2^s \times f_2 \quad (7)$$

Figure 4:
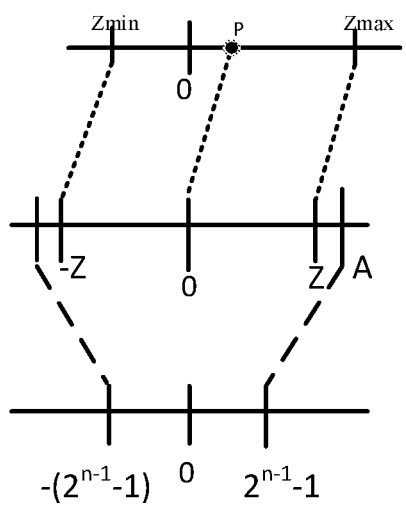
FIG. 4 is a schematic diagram of a fixed-point data representation with an introduced offset according to an example of the present disclosure.

FIG. 3 is a schematic diagram of symmetrical fixed-point data representation. The number field of the data to be quantized shown in FIG. 3 is distributed with "0" being a center of symmetry. Z refers to a maximum absolute value of all floating-point numbers in the number field of the data to be quantized, in FIG. 3, A refers to a maximum value of a floating-point number that can be represented by an n-bit fixed-point number, and the floating-point number A is converted into a fixed-point number as $2^{n-1}-1$. To avoid overflow, A needs to include Z. In practice, floating-point numbers involved in the process of neural network operation tend to be normally distributed in a certain interval, but may not be distributed with "0" being the center of symmetry. Therefore, the floating-point numbers being represented by fixed-point numbers may lead to overflow. To improve the situation, an offset is introduced into the quantization parameter, as shown in FIG. 4. In FIG. 4, the number field of the data to be quantized is not distributed with "0" being the center of symmetry. $Z_{min}$ refers to the minimum value of all floating-point numbers in the number field of the data to be quantized and $Z_{max}$ refers to the maximum value of all floating-point numbers in the number field of the data to be quantized. P is a center point between $Z_{min}$ and $Z_{max}$. The whole number field of the data to be quantized is shifted to make the shifted number field of the data to be quantized distributed with "0" being the center of symmetry, and the maximum absolute value in the shifted number field of the data to be quantized is the maximum value. As shown in FIG. 4, the offset refers to a horizontal distance between the point "0" and the point "P", and the distance is called an offset O, in which $$O = \frac{Z_{min}+Z_{max}}{2}, \text{ and } Z = \frac{Z_{max}-Z_{min}}{2}.$$

Based on the description of the offset O, a fourth situation of the quantization parameter appears, which is that the quantization parameter includes the point position parameter and the offset. In the situation, a following formula (8) may be used to quantize the data to be quantized to obtain the quantized data $I_x$.

$$I_x = round\left(\frac{F_x - O}{2^s}\right) \quad (8)$$

In the formula, s refers to the point position parameter; O refers to the offset, and $$O = \frac{Z_{min}+Z_{max}}{2};$$

$I_x$ refers to the n-bit binary representation value of the data x after quantization; $F_x$ refers to the floating-point value of the data x before quantization; and round refers to the rounding calculation, in which it should be noted that round is not limited to the round calculation and may refer to performing other rounding calculations such as the ceiling calculation, the flooring calculation, the fix calculation, and the like to replace the round calculation in the formula (8). The maximum value A in the number field of the data to be quantized may be represented by an n-bit fixed-point number as $2^s(2^{n-1}-1)$ then the maximum value in the number field of the data to be quantized may be represented by an n-bit fixed-point number as $2^s(2^{n-1}-1)+O$, and the minimum value in the number field of the data to be quantized may be represented by an n-bit fixed-point number as $-2^s(2^{n-1}-1)+O$. The formula (8) shows that when the data to be quantized is quantized with the quantization parameter corresponding to the fourth situation, the quantization interval is $2^s$ and is marked as C.

Given Z is the maximum absolute value of all numbers in the number field of the data to be quantized and $$Z = \frac{Z_{max}-Z_{min}}{2},$$

Z needs to be included in A and greater than $$\frac{A}{2}.$$

According to the formula (2), $$\log_2\left(\frac{Z}{2^{n-1}-1}\right) - 1 > s \geq \log_2\left(\frac{Z}{2^{n-1}-1}\right),$$

then $$s = ceil\left(\log_2\left(\frac{Z}{2^{n-1}-1}\right)\right) \text{ and } A = 2^{ceil\left(\log_2\frac{Z}{2^{n-1}-1}\right)}(2^{n-1}-1).$$

According to a formula (9), the n-bit binary representation value $I_x$ of the data x after quantization is inversely quantized to obtain the inverse quantized data $\hat{F}_x$, in which the data format of the inverse quantized data $\hat{F}_x$ is the same as that of the corresponding data $F_x$ before quantization, both of which are floating-point numbers.

$$\hat{F}_x = \text{round}\left(\frac{F_x - O}{2^s}\right) \times 2^s + O \tag{9}$$

Based on the description of the offset O, a fifth situation of the quantization parameter appears, which is that the quantization parameter includes the first scaling coefficient $f_1$ and the offset O. In the situation, a following formula (10) may be used to quantize the data to be quantized to obtain the quantized data $I_x$:

$$I_x = \text{round}\left(\frac{F_x - O}{f_1}\right) \tag{10}$$

In the formula, $f_1$ refers to the first scaling coefficient; O refers to the offset; $I_x$ refers to the n-bit binary representation value of the data x after quantization; $F_x$ refers to the floating-point value of the data x before quantization; and round refers to the rounding calculation, in which it should be noted that round is not limited to the round calculation and may refer to performing other rounding calculations such as the ceiling calculation, the flooring calculation, the fix calculation, and the like to replace the round calculation in the formula (10). In one situation, the point position parameter s is a known fixed value that does not change. Given $2^s = T$ and T is a fixed value, the maximum value A of a floating-point number may be represented by an n-bit fixed-point number as $(2^{n-1}-1) \times T$. In the situation, the maximum value A depends on the data bit width n. Given that Z is a maximum absolute value of all numbers in the number field of the data to be quantized, it follows that $$f_1 = \frac{Z}{2^{n-1} - 1}$$

and $Z = (2^{n-1}-1) \times f_1$. The maximum value in the number field of the data to be quantized may be represented by an n-bit fixed-point number as $(2^{n-1}-1) \times f_1$, and the minimum value in the number field of the data to be quantized may be represented by an n-bit fixed-point number as $-(2^{n-1}-1) \times f_1$. In another situation, $2^s \times f_2$ is considered as the first scaling coefficient $f_1$ as a whole, i.e., one variable, in engineering applications, which means that the point position parameter s can be independently varied. In $2^s \times f_2$, $f_2$ refers to the second scaling coefficient. Given that Z is the maximum absolute value of all numbers in the number field of the data to be quantized, it follows that $$f_1 = \frac{Z}{2^{n-1} - 1}$$

and $Z = (2^{n-1}-1) \times f_1$. The maximum value in the number field of the data to be quantized may be represented by an n-bit fixed-point number as $(2^{n-1}-1) \times f_1 + O$, and the minimum value in the number field of the data to be quantized may be represented by an n-bit fixed-point number as $-(2^{n-1}-1) \times f_1 + O$.

The formula (10) shows that when the data to be quantized is quantized with the quantization parameter corresponding to the fifth situation, the quantization interval is $f_1$ and is marked as C.

According to a formula (11), the n-bit binary representation value $I_x$ of the data x after quantization is inversely quantized to obtain the inverse quantized data $\hat{F}_x$, in which the data format of the inverse quantized data $\hat{F}_x$ is the same as that of the corresponding data $F_x$ before quantization, both of which are floating-point numbers.

$$\hat{F}_x = \text{round}\left(\frac{F_x - O}{f_1}\right) \times f_1 + O \tag{11}$$

Based on the description of the offset O, a sixth situation of the quantization parameter appears, which is that the quantization parameter includes the point position parameter, the second scaling coefficient $f_2$, and the offset O. In the situation, a following formula (12) may be used to quantize the data to be quantized to obtain the quantized data $I_x$.

$$I_x = \text{round}\left(\frac{F_x - O}{2^s \times f_2}\right) \tag{12}$$

In the formula, s refers to the point position parameter; O refers to the offset; $f_2$ refers to the second scaling coefficient, and $$f_2 = \frac{Z}{2^s(2^{n-1} - 1)}; Z = \frac{Z_{max} - Z_{min}}{2};$$

$I_x$ refers to the n-bit binary representation value of the data x after quantization; $F_x$ refers to the floating-point value of the data x before quantization; and round refers to the rounding calculation, in which it should be noted that round is not limited to the round calculation and may refer to performing other rounding calculations such as the ceiling calculation, the flooring calculation, the fix calculation, and the like to replace the round calculation in the formula (12). The maximum value in the number field of the data to be quantized may be represented by an n-bit fixed-point number as $2^s(2^{n-1}-1)$. The formula (12) shows that when the data to be quantized is quantized with the quantization parameter corresponding to the sixth situation, the quantization interval is $2^s \times f_2$ and is marked as C.

Given Z is the maximum absolute value of all numbers in the number field of the data to be quantized, according to the formula (2), $$1 \geq \frac{Z}{2^s(2^{n-1} - 1)} > \frac{1}{2},$$

which means that $$1 \geq \frac{Z}{A} > \frac{1}{2} \text{ and } 1 \geq f_2 > \frac{1}{2}.$$

When $$f_2 = \frac{Z}{2^s(2^{n-1}-1)} = \frac{Z}{A},$$

according to the formula (2), Z may not affect the precision representation. When $f_2=1$, $$s = \text{ceil}\left(\log_2\left(\frac{Z_{max} - Z_{min}}{2(2^{n-1}-1)}\right)\right).$$

The maximum value in the number field of the data to be quantized may be represented by an n-bit fixed-point number as $(2^{n-1}-1)\times 2^s \times f_2+O$, and the minimum value in the number field of the data to be quantized may be represented by an n-bit fixed-point number as $-(2^{n-1}-1)\times 2^s \times f_2+O$.

According to a formula (13), the n-bit binary representation value $I_x$ of the data x after quantization is inversely quantized to obtain the inverse quantized data $\hat{F}_x$, in which the data format of the inverse quantized data $\hat{F}_x$ is the same as that of the corresponding data $F_x$ before quantization, both of which are floating-point numbers.

$$\hat{F}_x = \text{round}\left(\frac{F_x}{2^s \times f_2}\right) \times 2^s \times f_2 + O \tag{13}$$

The determination process of six types of quantization parameters are described in detail above, and are merely exemplary descriptions. The types of quantization parameters can be different from the above description in different examples. According to the formula (1) to the formula (13), both the point position parameter and the scaling coefficients are related to the data bit width. Different data bit width may lead to different point position parameters and scaling coefficients, which may affect the quantization precision. In the process of training or fine-tuning, within a certain range of iteration times, quantization by using the same bit width may have little effect on the overall precision of the neural network operation. If the number of iterations exceeds a certain number, quantization by using the same bit width may not meet the training or fine-tuning requirements on precision, which requires adjustment of the data bit width n with the training or the fine-tuning process. Simply, the data bit width n can be set artificially. Within different ranges of iterations times, a preset corresponding bit width n may be used. However, the process of training by using low bit-width fixed-point numbers is complex. Therefore, the adjustment method of artificially presetting the data bit width basically cannot meet the requirements of practical applications.

In the present technical scheme, the data bit width n is adjusted according to the quantization error $\text{diff}_{bit}$. Furthermore, the quantization error $\text{diff}_{bit}$ is compared with a threshold to obtain a comparison result. The threshold includes a first threshold and a second threshold, and the first threshold is greater than the second threshold. The comparison result may include three situations. If the quantization error $\text{diff}_{bit}$ is greater than or equal to the first threshold (situation one), the data bit width can be increased. If the quantization error $\text{diff}_{bit}$ is less than or equal to the second threshold (situation two), the data bit width can be reduced. If the quantization error $\text{diff}_{bit}$ is between the first threshold and the second threshold (situation three), the data bit width remains unchanged. In practical applications, the first threshold and the second threshold may be empirical values or variable hyperparameters. Conventional optimization methods for hyperparameters are suitable for both the first threshold and the second threshold, which will not be described further.

It should be emphasized that the data bit width can be adjusted according to a fixed bit stride, or according to a variable stride based on the difference between the quantization error and an error threshold. The data bit width may be adjusted to be longer or shorter according to actual needs in the process of neural network operation. For example, the data bit width n in a current convolution layer is 16, and is then adjusted to 12 according to the quantization error $\text{diff}_{bit}$. In practical applications, the need for precision in the process of neural network operation can be met when the value of the data bit width n is 12, but does not necessarily need to be 16. In this way, the fixed-point computing speed may be greatly improved within a tolerance range of precision, which improves the resource utilization rate of an artificial intelligence processor chip.

For the quantization error $\text{diff}_{bit}$, the quantization error is determined according to the quantized data and the corresponding pre-quantized data. In practical applications, there are three quantization error determination methods, all of which can be applied to the present technical scheme. The first method is to determine the quantization error according to a formula (14) based on the quantization interval, the number of quantized data, and the corresponding pre-quantized data.

$$\text{diff}_{bit} = \log_2\left(\frac{C*2^{-1}*m}{\sum_i |F_i|}\right) \tag{14}$$

In the formula, C refers to the corresponding quantization interval during quantization, m refers to the number of quantized data obtained after quantization, and $F_i$ refers to the corresponding floating-point value of the data to be quantized, in which i is a subscript of data in a set of the data to be quantized.

The second method is to determine the quantization error $\text{diff}_{bit}$ according to a formula (15) based on the quantized data and the corresponding inverse quantized data.

$$\text{diff}_{bit} = \log_2\left(\frac{\sum_i |\hat{F}_i| - \sum_i |F_i|}{\sum_i |F_i|} + 1\right) \tag{15}$$

In the formula, $F_i$ refers to the corresponding floating-point value of the data to be quantized, in which i is the subscript of data in the set of the data to be quantized. $\hat{F}_i$ refers to the inverse quantized data corresponding to the floating-point value.

The third method is to determine the quantization error $\text{diff}_{bit}$ according to a formula (16) based on the quantized data and the corresponding inverse quantized data.

$$\text{diff}_{bit} = \log_2\left(\frac{\sum_i |\hat{F}_i - F_i|}{\sum_i |F_i|} + 1\right) \tag{16}$$

In the formula, $F_i$ refers to the corresponding floating-point value of the data to be quantized, in which i is the subscript of data in the set of the data to be quantized. $\hat{F}_i$ refers to the inverse quantized data corresponding to the floating-point value.

It should be emphasized that the above methods of obtaining the quantization error $\text{diff}_{bit}$ are only an incomplete, not exhaustive, list of examples. Those of ordinary skill in the art may make modifications or variations within the spirit and principle of the disclosure. As long as functions and technical effects realized by the modifications or variations support determining the quantization error according to the quantized data and the corresponding pre-quantized data are similar to those of the present disclosure, the modifications or variations shall fall within the scope of protection of the present disclosure.

Figure 5A:
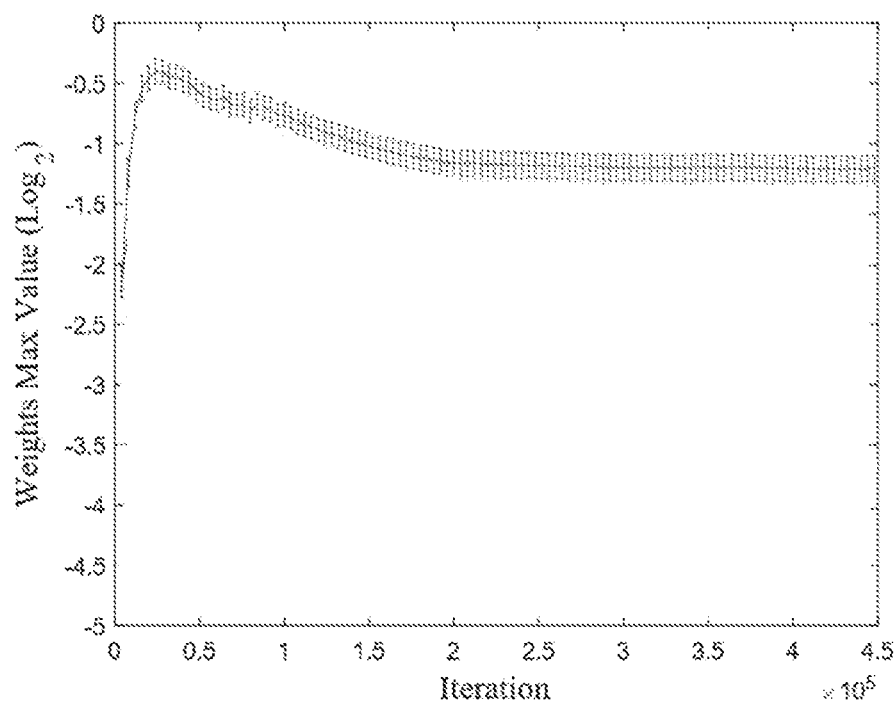
FIG. 5a is a curve illustrating a weight variation range of a neural network in the training process according to an example of the present disclosure.
Figure 5B:
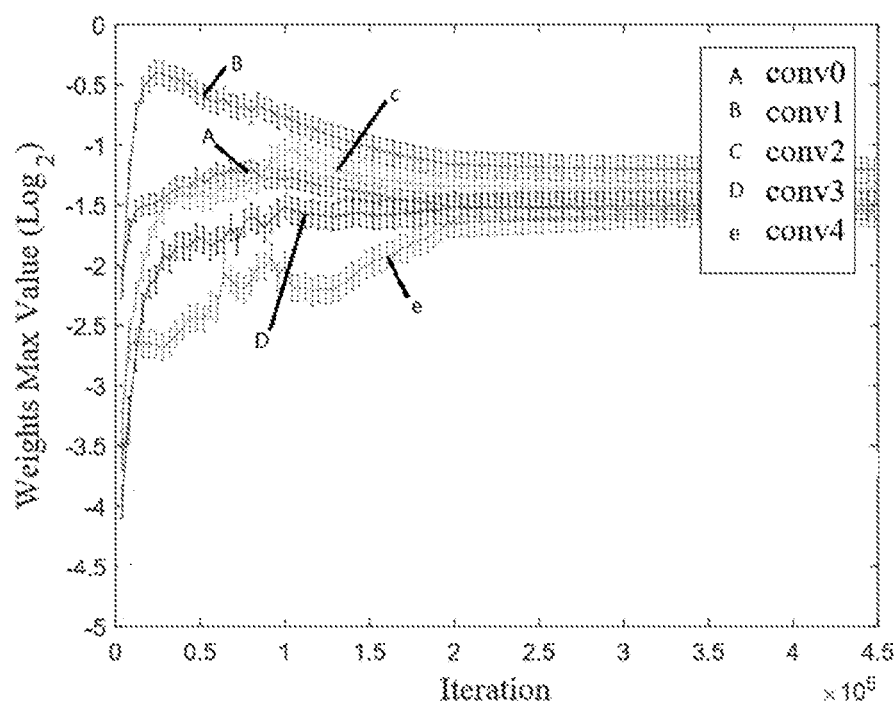
FIG. 5b is another curve illustrating a weight variation range of a neural network in the training process according to an example of the present disclosure.

For the data bit width, FIG. 5a is a curve illustrating a weight variation range of a neural network in the training process. FIG. 5b is another curve illustrating a weight variation range of the neural network in the training process. In FIG. 5a and FIG. 5b, the abscissa represents the number of iterations, and the ordinate represents a maximum value of a weight after calculating a logarithm. The variation range curve of weight shown in FIG. 5a illustrates the weight variation situation of any convolution layer in the neural network corresponding to different iterations in the same epoch. In FIG. 5b, a conv0 layer corresponds to a weight variation range curve A; a conv1 layer corresponds to a weight variation range curve B; a conv2 layer corresponds to a weight variation range curve C; a conv3 layer corresponds to a weight variation range curve D; and the conv4 layer corresponds to the weight variation range curve e. According to FIG. 5a and FIG. 5b, in a same epoch, the variation range of the weight in each iteration is large in an initial stage of training, while in middle and later stages of training, the variation range of the weight in each iteration is not large. In such case, in the middle and later stages of training, since the variation range of the weight is not large before and after each iteration, the weight of corresponding layers in each iteration have similarity within a certain iteration interval, and the data involved in the neural network training process in each layer can be quantized by using the data bit width used in the quantization of the corresponding layer in the previous iteration. However, in the initial stage of training, because of the large variation range of the weight before and after each iteration, in order to achieve the precision of the floating-point computation required for quantization, in each iteration in the initial stage of training, the weight of the corresponding layer in the current iteration is quantized by using the data bit width used in the quantization of the corresponding layer in the previous iteration, or the weight of the current layer is quantized based on the preset data bit width n of the current layer to obtain quantized fixed-point numbers. According to the quantized weight and the corresponding pre-quantized weight, the quantization error $\text{diff}_{bit}$ is determined. According to the comparison result of the quantization error $\text{diff}_{bit}$ and the threshold, the data bit width n used in the quantization of the corresponding layer in the previous iteration or the preset data bit width n of the current layer is adjusted, and the adjusted data bit width is applied to the quantization of the weight of the corresponding layer in the current iteration. Furthermore, in the process of training or fine-tuning, the weights between each layer in the neural network are independent of each other and have no similarity, which makes neurons between each layer independent of each other and have no similarity. Therefore, in the process of neural network training or fine-tuning, the data bit width of each layer in each iteration of the neural network is only suitable to be used in the corresponding neural network layer.

The weight is used as an example above. In the process of neural network training or fine-tuning, the corresponding bit width of the neuron and the gradient can be treated similarly or processed similarly, which will not be further described.

In the inference process of a neural network, the weights between each layer in the neural network are independent of each other and have no similarity, which makes neurons between each layer independent of each other and have no similarity. Therefore, in the inference process of the neural network, the data bit width of each layer in the neural network is applied to the corresponding layer. In practical applications, in the inference process, the input neuron of each layer may not be the same or similar. Moreover, since the weights between each layer in the neural network are independent of each other, the input neurons of each of the hidden layers in the neural network are different. During quantization, it may be not suitable for the data bit width used by the input neuron of the upper layer to be applied to the input neuron of the current layer. Therefore, in order to achieve the precision of floating-point computation required for quantization, in the reference process, the input neuron of the current layer is quantized by using the data bit width used in the quantization of the upper layer, or the input neuron of the current layer is quantized based on the preset data bit width n of the current layer to obtain quantized fixed-point numbers. According to the pre-quantized input neuron and the corresponding quantized input neuron, the quantization error $\text{diff}_{bit}$ is determined. According to the comparison result of the quantization error $\text{diff}_{bit}$ and the threshold, the data bit width n used in the quantization of the upper layer or the preset data bit width n of the current layer is adjusted, and the adjusted data bit width is applied to the quantization of the input neuron of the corresponding layer in the current iteration. The corresponding data bit width of the weight can be adjusted similarly, which will not be further described.

For the quantization parameter, it can be seen from FIG. 5a that in a same epoch, the variation range of the weight in each iteration is large in the initial stage of training, while in the middle and later stages of training, since the variation range of the weight is smaller before and after each iteration, the weights of corresponding layers in each iteration have similarity within a certain iteration interval, which means that data involved in the neural network training process in each layer can be quantized by using the data bit width used in the quantization of the corresponding layer in the previous iteration. In the situation, in the middle and later stages of training, the quantization parameter may not need to be determined in each iteration and determination of the quantization parameter in each layer in each iteration of the neural network in the initial stage of training may still achieve the precision of the floating-point computation required for quantization.

Furthermore, in the process of training or fine-tuning, the weights between each layer in the neural network are independent of each other and have no similarity, which makes neuron between each layer independent of each other and have no similarity. Therefore, in the process of neural network training or fine-tuning, the data bit width of each layer in each iteration of the neural network is applied to the corresponding layer.

The weight is used as an example above, in the process of neural network training or fine-tuning, the corresponding bit width of the neuron and the gradient can be determined or adjusted similarly, which will not be further described.

In the inference process of a neural network, the weights of each layer in the neural network are independent of each other and have no similarity, which makes the neurons between each layer independent of each other and have no similarity. Therefore, in the inference process of the neural network, the quantitation parameter of each layer in the neural network is applied to the data to be quantized of the corresponding layer. For example, if the current layer of the neural network is a convolution layer and the quantization parameter of the data to be quantized of the current convolution layer is obtained according to the data to be quantized in the convolution layer based on the technical scheme shown in FIG. 2, the quantization parameter can be applied only to the current convolution layer but not to other layers in the neural network, even if the other layers are convolution layers.

To sum up, an extension strategy of the data bit width and the quantization parameter is determined based on the similarity between data. If the similarity exists between data, the data bit width and the quantization parameter can be continuously used. If no similarity exists between data, the data bit width or the quantization parameter needs to be adjusted. The similarity between data is usually measured by KL divergence or by a following formula (17).

$$\text{abs max}(A) \approx \text{abs max}(B) \text{ ∏. mean}(A) \approx \text{mean}(B) \quad (17)$$

In some examples, if data A and data B satisfy the formula (17), the data A and the data B are determined to have similarity.

It should be noted that the above determination method of the quantization error, the adjusting method of the data bit width, and the extension strategy of the data bit width and the quantization parameter are only a partial, not exhaustive, list of examples. For example, the above determination method of the quantization error, the adjusting method of the data bit width, and the extension strategy of the data bit width and the quantization parameter are all applicable to the fine-tuning process of a neural network. Moreover, for the measurement of similarity between data, the above-mentioned methods of measuring similarity by KL divergence and the formula (17) are only a partial, not exhaustive, list of examples, such as a histogram matching method, a matrix decomposition method, an image similarity calculation method based on feature points, a proximity measurement standard method, and the like. Those of ordinary skill in the art may make modifications or variations within the spirit and principle of the disclosure. As long as functions and technical effects realized by the modifications or variations are similar to those of the present disclosure, the modifications or variations shall fall within the scope of protection of the present disclosure In summary, in the middle and later stages of training, since the variation range of the weight is not large before and after each iteration, the weights of the corresponding layer in each iteration have similarity within a certain iteration interval. In order to make the technical scheme more universal in training or fine-tuning and achieve reasonable unitization of the resources of the artificial intelligence processor chip, a strategy is needed to determine an iteration interval to make the data bit width n of the corresponding layer in each iteration remain unchanged within the iteration interval. If the iteration interval is exceeded, the data bit width n changes, then it is not necessary to determine in each iteration whether the data bit width n needs to be adjusted or not. The quantization parameter can be treated similarly, which may improve the peak computing power of an artificial intelligence processor chip while simultaneously ensuring the precision of floating-point computation required for quantization.

Figure 6:
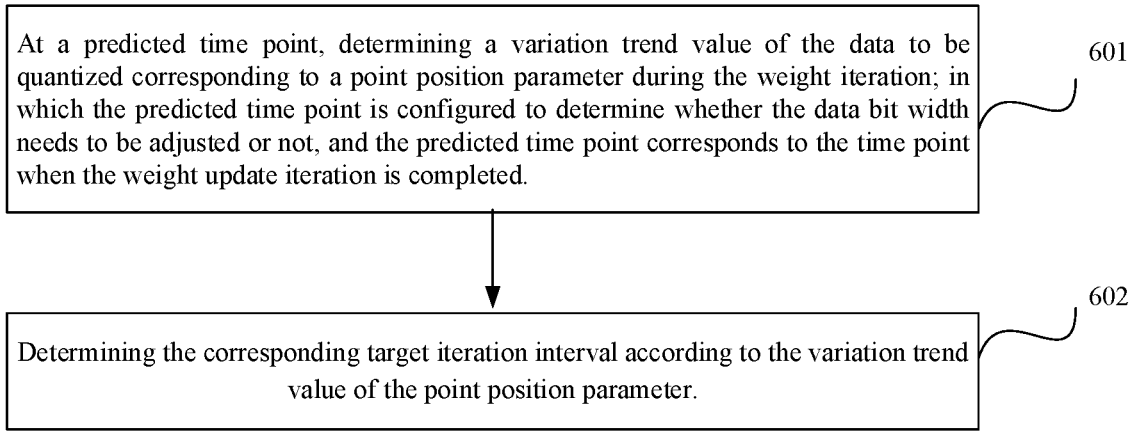
FIG. 6 is a flow chart illustrating a target iteration interval determination method according to an example of the present disclosure.

As shown in FIG. 6, a flow chart illustrates a target iteration interval determination method. In the technical scheme shown in FIG. 6, the target iteration interval includes at least one weight update iteration, and the same bit width is used in the quantization process within the same target iteration interval. The steps of determining the target iteration interval include:

step 601: at a predicted time point, determining a variation trend value of a point position parameter corresponding to the data to be quantized in the weight iteration process, in which the predicted time point is used to determine whether the data bit width needs to be adjusted or not, and the predicted time point corresponds to the time point when the weight update iteration is completed.

In the step, according to a formula (18), the variation trend value of the point position parameter is determined according to a moving average value of the point position parameter corresponding to a current predicted time point in the weight iteration process and a moving average value of the point position parameter corresponding to a previous predicted time point in the weight iteration process, or according to the point position parameter corresponding to the current predicted time point in the weight iteration process and the moving average value of the corresponding point position parameter corresponding to the previous predicted time point in the weight iteration process. A formula (18) is represented as:

$$\text{diff}_{update1} = |M^{(t)} - M^{(t-1)}| = \alpha |s^{(t)} - M^{(t-1)}| \quad (18)$$

In the formula (18), M refers to the moving average value of the point position parameter s, which increases with the training iteration, in which $M^{(t)}$ refers to the moving average value of the point position parameter s corresponding to the $t^{th}$ predicted time point, which increases with the training iteration and is obtained according to a formula (19); $s^{(t)}$ refers to the point position parameter s corresponding to the $t^{th}$ predicted time point; $M^{(t-1)}$ refers to the moving average value of the point position parameter s corresponding to the $t-1^{th}$ predicted time point; and $\alpha$ refers to a hyperparameter. $\text{diff}_{update1}$ measures the variation trend of the point position parameter s, in which the variation of the point position parameter s is reflected in the variation of the maximum value $Z_{max}$ of the current data to be quantized. A greater $\text{diff}_{update1}$ indicates a larger variation range of numerical values and requires an update frequency with a shorter interval, which means a smaller target iteration interval.

$$M^{(t)} \leftarrow \alpha \times s^{(t-1)} + (1-\alpha) \times M^{(t-1)} \quad (19)$$

Step 602: determining the corresponding target iteration interval according to the variation trend value of the point position parameter.

In the present technical scheme, the target iteration interval is determined according to a formula (20). For the target iteration interval, the same data bit width is used in the quantization process within the same target iteration interval, and the data bit width used in the quantization process within different target iteration intervals may be the same or different.

$$I = \frac{\beta}{\text{diff}_{update1}} - \gamma \quad (20)$$

In the formula (20), I refers to the target iteration interval. $\text{diff}_{update1}$ refers to the variation trend value of the point position parameter. β and γ may be empirical values or variable hyperparameters. Conventional optimization methods for hyperparameters are suitable for both β and γ, which will not be described further.

In the present technical scheme, the predicted time point includes a first predicted time point. The first predicted time point is determined according to the target iteration interval. For example, the weight of the corresponding layer in the current iteration is quantized by using the data bit width used in the quantization of the corresponding layer in the previous iteration at the $t^{th}$ predicted time point in the training or fine-tuning process to obtain a quantized fixed-point number. The quantization error $\text{diff}_{bit}$ is determined according to the pre-quantized weight and the corresponding quantized weight. The quantization error $\text{diff}_{bit}$ is compared with the first threshold and the second threshold respectively to obtain a comparison result, and the comparison result is used to determine whether the data bit width used in the quantization of the corresponding layer in the previous iteration needs to be adjusted or not. If the $t^{th}$ first predicted time point corresponds to an $100^{th}$ iteration and the data bit width used in a 99th iteration is $n_1$, the quantization error $\text{diff}_{bit}$ is determined according to the data bit width $n_1$ in the $100^{th}$ iteration, and then the quantization error $\text{diff}_{bit}$ is compared with the first threshold and the second threshold to obtain a comparison result. If it is determined according to the comparison result that the data bit width $n_1$ does not need to be adjusted, the target iteration interval is determined to be 8 iterations according to the formula (20). If the $100^{th}$ iteration is taken as an initial iteration within the current target iteration interval, the $100^{th}$ iteration to an $107^{th}$ iteration are taken as the current target iteration interval; and if the $100^{th}$ iteration is taken as a last iteration within the previous target iteration interval, an $101^{st}$ iteration to an $108^{th}$ iteration are taken as the current target iteration interval. During quantization within the current target iteration interval, the data bit width $n_1$ used in the previous target iteration interval is still used in each iteration. In the situation, the data bit widths used in quantization within different target iteration intervals can be the same. If the $100^{th}$ iteration to the $107^{th}$ iteration are taken as the current target iteration interval, the $108^{th}$ iteration in a next target iteration interval is taken as a t+$1^{th}$ first predicted time point; and if the $101^{st}$ iteration to the $108^{th}$ iteration are taken as the current target iteration interval, the $108^{th}$ iteration in the current target iteration interval is taken as the t+$1^{th}$ first predicted time point. At the t+$1^{th}$ first predicted time point, the quantization error $\text{diff}_{bit}$ is determined according to the data bit width $n_1$, and the quantization error $\text{diff}_{bit}$ is compared with the first threshold and the second threshold to obtain a comparison result. It is determined according to the comparison result that the data bit width $n_1$ needs to be adjusted to $n_2$, and the target iteration interval is determined to be 55 iterations according to the formula (20). Then from the 108th iteration to the 163th iteration or from the 109th iteration to the 163th iteration are taken as the target iteration interval, and the data bit width $n_2$ is used in each iteration during quantization within the target iteration interval. In the situation, the data bit widths used in quantization between different target iteration intervals can be different.

In the present technical scheme, no matter whether the first predicted time point is the initial iteration or the last iteration within the target iteration interval, the formula (18) is suitable to be used to obtain the variation trend value of the point position parameter. If the current first predicted time point is the initial iteration within the current target iteration interval, then in the formula (18), $M^{(t)}$ refers to the moving average value of the point position parameter s corresponding to the corresponding time point of the initial iteration within the current target iteration interval, which increases with the training iteration; $s^{(t)}$ refers to the point position parameter s corresponding to the corresponding time point of the initial iteration of the current target iteration interval; and $M^{(t-1)}$ refers to the moving average value of the point position parameter s corresponding to the corresponding time point of the initial iteration within the previous target iteration interval, which increases with the training iteration. If the current first predicted time point is the last iteration within the current target iteration interval, then in the formula (18), $M^{(t)}$ refers to the moving average value of the point position parameter s corresponding to the corresponding time point of the last iteration within the current target iteration interval, which increases with the training iteration; $s^{(t)}$ refers to the point position parameter s corresponding to the corresponding time point of the last iteration within the current target iteration interval; and $M^{(t-1)}$ refers to the moving average value of the point position parameter s corresponding to the corresponding time point of the last iteration within the previous target iteration interval, which increases with the training iteration.

In the present technical scheme, on the basis of including the first predicted time point, the predicted time point may further include a second predicted time point, in which the second predicted time point is determined according to a curve of data variation range. Based on the variation range of big data in the training process of a neural network, the curve of data variation range as shown in FIG. 5a is obtained.

Taking weight as an example, it can be seen from the curve of data variation range shown in FIG. 5a that during the iteration interval period from the beginning of training to the $T^{th}$ iteration, the data variation range is large in each weight update. During quantization at the current predicted time point, data is first quantized in the current iteration by using the data bit width $n_1$ used in the previous iteration, and then the corresponding quantization error is determined by the obtained quantization result and the corresponding pre-quantized data. The quantization error is compared with the first threshold and the second threshold respectively to obtain a comparison result, and the data bit width $n_1$ is adjusted according to the comparison result to obtain a data bit width $n_2$. The data bit width $n_2$ is used to quantize the weight to be quantized involved in the current iteration. Then the target iteration interval is determined according to the formula (20) to determine a first predicted time point, and whether and how to adjust the data bit width are determined at the first predicted time point. Then a next target iteration interval is determined according to the formula (20) to obtain a next first predicted time point. During the iteration interval period from the beginning of training to the $T^{th}$ iteration, the weight variation range is large before and after each iteration, which means the weight of the corresponding layers in each iteration have no similarity. In order to ensure precision, during quantization, data of each layer in the current iteration may not continue to use the corresponding quantization parameter of the corresponding layer in the previous iteration. In the first T iterations, the data bit width can be adjusted by iterations. In the situation, the data bit width used by each iteration in the first T iterations is different, and the target iteration interval is one iteration. In order to optimize resource utilization of an artificial intelligence processor chip, the target iteration interval in the first T iterations can be preset according to rules revealed in the curve of data variation range shown in FIG. 5a, which means the target iteration interval of the first T iterations can be preset according to the curve of data variation range without a need to use the formula (20) to determine the time point of weight update iteration completion corresponding to each iteration in the first T iterations as the second predicted time point. Therefore, the resources of the artificial intelligence processor chip may be utilized more reasonably. Form the curve of data variation range shown in FIG. 5a, the variation range is not large from the $T^{th}$ iteration. So in the middle and later stages of training, it is not necessary to determine the quantization parameter in each iteration. In the $T^{th}$ or the $T+1^{th}$ iteration, a quantization error is determined by using the pre-quantized data and the quantized data corresponding to the current iteration. Whether and how to adjust the data bit width are determined by the quantization error, and the target iteration interval is determined according to the formula (20). If the target iteration interval is determined to be 55 iterations, it requires that the corresponding time point of 55 iterations after the $T^{th}$ or the $T+1^{th}$ iteration be taken as the first predicted time point to determine whether and how to adjust the data bit width, and to determine the next target iteration interval according to the formula (20) so as to determine the next first predicted time point until the computation of all iterations within the same epoch is completed. On this basis, after each epoch, the data bit width or the quantization parameter may be adaptively adjust, and finally the quantized data may be used to obtain a neural network with an expected precision.

If a value of T is determined to be 130 according to the curve of weight variation range shown in FIG. 5a (the value does not correspond to FIG. 5a, it is only for convenience of description to assume that the value of T is 130, and the value is not limited to the assumed value), an $130^{th}$ iteration in the training process is taken as the second predicted time point and the current first predicted time point is the $100^{th}$ iteration in the training process. The target iteration interval is determined to be 35 iterations according to the formula (20) in the $100^{th}$ iteration. Within the target iteration interval, when training to the $130^{th}$ iteration and reaching the second predicted time point, it is needed to determine whether and how to adjust the data bit width at the corresponding time point of the $130^{th}$ iteration, and to determine the target iteration interval according to the formula (20). If the target iteration interval in the situation is determined to be 42 iterations, from the $130^{th}$ iteration to the $172^{nd}$ iteration is viewed as the target iteration interval, and the $135^{th}$ iteration corresponding to the first predicted time point determined when the target iteration interval is 35 iterations is within the target iteration interval of 42 iterations. In the $135^{th}$ iteration, whether and how to adjust the data bit width can be determined according to formula (20). It is also possible to determine whether and how to adjust the data bit width directly in the $172^{th}$ iteration rather than in the $135^{th}$ iteration. In conclusion, whether to perform evaluation and prediction in the $135^{th}$ iteration or not are both suitable for the present technical scheme.

To summarize, the second predicted time point may be preset according to the curve of data variation range. In the initial stage of training or fine-tuning, it is not necessary to use resources of an artificial intelligence processor chip to determine a target iteration interval. At the preset second predicted time point, the data bit width is directly adjusted according to the quantization error, and the adjusted data is used to quantize the data to be quantized involved in the current iteration. In the middle and later stages of training or fine-tuning, the target iteration interval is obtained according to the formula (20) to determine the corresponding first predicted time point, and determine whether and how to adjust the data bit width at each first predicted time point. Therefore, resources of an artificial intelligence processor chip may be reasonably utilized while simultaneously ensuring the precision of floating-point computation required for quantization, which may improve quantization efficiency.

Figure 7:
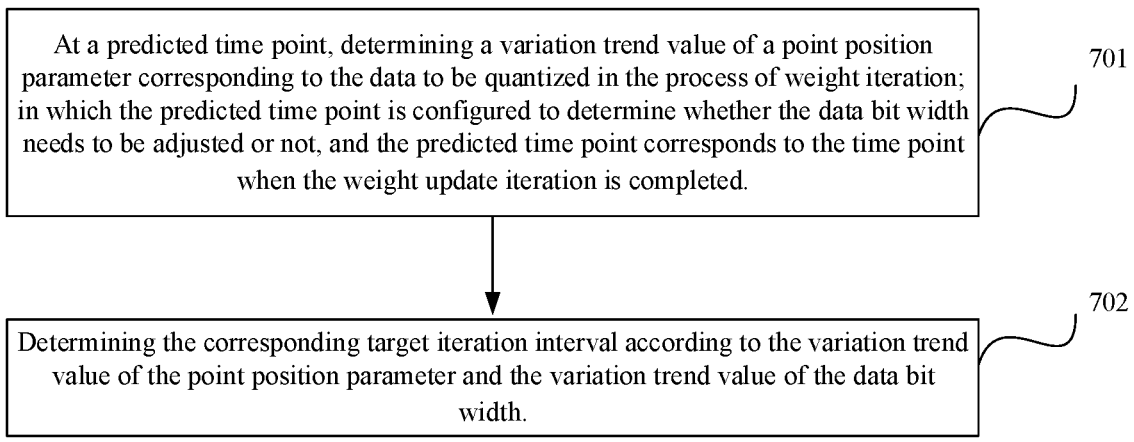
FIG. 7 is another flow chart illustrating a target iteration interval determination method according to an example of the present disclosure.

In practice, in order to obtain a more accurate target iteration interval of data bit width, both the variation trend value $\text{diff}_{update1}$ of a point position parameter and the variation trend value $\text{diff}_{update2}$ of the data bit width can be considered simultaneously. As shown in FIG. 7, a flow chart illustrates a target iteration interval determination method. The steps of determining the target iteration interval include:

step 701: at a predicted time point, determining the variation trend value of the point position parameter and the variation trend value of the data bit width corresponding to the data to be quantized involved in the weight iteration process, in which at the predicted time point it is determined whether the data bit width needs to be adjusted or not, and the predicted time point corresponds to the time point when the weight update iteration is completed.

It should be emphasized that the technical scheme shown in FIG. 6 for determining the target iteration interval of the data bit width based on the variation trend value of the point position parameter is applicable to the technical scheme shown in FIG. 7, which will not be described further.

In the step, the variation trend value of the data bit width is determined by using the corresponding quantization error according to a formula (21).

$$\text{diff}_{update2} = \delta * \text{diff}_{bit}^2 \qquad (21)$$

In the formula (21), $\delta$ refers to a hyperparameter; $\text{diff}_{bit}$ refers to a quantization error; and $\text{diff}_{update2}$ refers to a variation trend value of data bit width. The variable $\text{diff}_{update2}$ measures the variation trend of the data bit width n used in quantization. A greater $\text{diff}_{update2}$ indicates that a fixed-point bit width needs to be updated and an update frequency with a shorter interval is needed.

The variation trend value of the point position parameter shown in FIG. 7 may still be obtained according to the formula (18), and $M^{(t)}$ in the formula (18) is obtained according to the formula (19). $\text{diff}_{update1}$ measures the variation trend of the point position parameter s, in which the variation of the point position parameter s is reflected in the variation of the maximum value $Z_{max}$ of the current data to be quantized. A greater $\text{diff}_{update1}$ indicates a larger variation range of numerical values and requires the update frequency with a shorter interval, which means a smaller target iteration interval.

Step 702: determining the corresponding target iteration interval according to the variation trend value of the point position parameter and the variation trend value of the data bit width.

In the present technical scheme, the target iteration interval is determined according to a formula (22). For the target iteration interval, the same data bit width is used in the quantization process within the same target iteration interval, and the data bit width used in the quantization process within different target iteration intervals may be the same or different.

$$I = \frac{\beta}{\max(\text{diff}_{update1}, \text{diff}_{update2})} - \gamma \qquad (22)$$

In the formula (22), I refers to the target iteration interval; β and γ refer to hyperparameters; $\text{diff}_{update1}$ refers to the variation trend value of the point position parameter; and $\text{diff}_{update2}$ refers to the variation trend value of the data bit width. β and γ may be empirical values or variable hyperparameters. Conventional optimization methods for hyperparameters are suitable for both β and γ, which will not be described further.

In the present technical scheme, $\text{diff}_{update1}$ measures the variation trend of the point position parameter s, but the variation of the point position parameter s caused by the variation of the data bit width n needs to be ignored because the variation of the data bit width n is reflected in $\text{diff}_{update2}$. If the variation of the point position parameter s caused by the variation of the data bit width n is not ignored, the target iteration interval I determined according to the formula (22) may be inaccurate, which may result in too many first predicted time points. As a result, in the process of training or fine-tuning, the operation of determining whether and how to update the data bit width n may be frequently performed, which may lead to unreasonable utilization of resources of an artificial intelligence processor chip.

Based on the above description, $\text{diff}_{update1}$ is determined according to $M^{(t)}$. If the data bit width corresponding to the $T-1^{th}$ predicted time point is $n_1$, the moving average value of the point position parameter is $m_1$, which increases with the training iteration. The data to be quantized is quantized by using the data bit width $n_1$ to obtain a quantized fixed-point number. The quantization error $\text{diff}_{bit}$ is determined according to the pre-quantized data and the corresponding quantized data, and the quantization error $\text{diff}_{bit}$ is compared with the threshold to obtain a comparison result. According to the comparison result, the data bit width $n_1$ is adjusted to $n_2$, and the data bit width is adjusted by $|n_1-n_2|$ bits. The data bit width used in quantization at the $t^{th}$ predicted time point is $n_2$. In order to ignore the variation of the point position parameter caused by the variation of the data bit width, one of following two optimization methods can be selected when $M^{(t)}$ is determined. The first method is as follows: if the data bit width is increased by $|n_1-n_2|$ bits, the value of $s^{(t-1)}$ is $s_1-|n_1-n_2|$ and the value of $M^{(t-1)}$ is $m_1-|n_1-n_2|$, $s^{(t-1)}$ and $M^{(t-1)}$ are put into the formula (19) to obtain $M^{(t)}$, which is the moving average value of the point position parameter corresponding to the $t^{th}$ predicted time point and increases with the training iteration. If the data bit width is reduced by $|n_1-n_2|$ bits, the value of $s^{(t-1)}$ is $s_1+|n_1-n_2|$ and the value of $M^{(t-1)}$ is $m_1+|n_1-n_2|$, $s^{(t-1)}$ and $M^{(t-1)}$ are put into the formula (19) to obtain $M^{(t)}$, which is the moving average value of the point position parameter corresponding to the $t^{th}$ predicted time point and increases with the training iteration. The second method is as follows: no matter whether the data bit width is increased or reduced by $|n_1-n_2|$ bits, the value of $s^{(t-1)}$ is $s_1$ and the value of $M^{(t-1)}$ is $m_1$, $s^{(t-1)}$ and $M^{(t-1)}$ are plugged into the formula (19) to obtain $M^{(t)}$. When the data bit width is increased by $|n_1-n_2|$ bits, $|n_1-n_2|$ is subtracted from $M^{(t)}$; and when the data bit width is reduced by $|n_1-n_2|$ bits, $|n_1-n_2|$ is added to $M^{(t)}$; the obtained result is taken as the moving average value of the point position parameter corresponding to the $t^{th}$ predicted time point, which increases with the training iteration. The above two methods are equivalent and both disregard the variation of the point position parameter caused by the variation of the data bit width and obtain a more accurate target iteration interval, which may improve the resources utilization rate of an artificial intelligence processor chip.

In practical applications, the data bit width n and the point position parameter s may have a great impact on quantization precision, while the second scaling coefficient $f_2$ and the offset O may have little impact on quantization precision. For the first scaling coefficient $f_1$, as mentioned above, in the second situation when $2^s \times f_2$ is taken as the first scaling coefficient as a whole, since the point position parameter s may have a great impact on quantization, the first scaling coefficient may have a great impact on quantization. Therefore, in the present technical scheme, it makes sense to determine the target iteration interval of the point position parameter no matter whether the data bit width n and the point position parameter s are adjusted or not. The idea of the technical scheme shown in FIG. 6 can be used to determine the target iteration interval of the point position parameter s. Therefore, an exemplary method for determining the target iteration interval of the point position parameter s shown in FIG. 8 may include:

step 801: at a predicted time point, determining a variation trend value of the position parameter corresponding to the data to be quantized involved in the weight iteration, in which at the predicted time point it is determined whether the quantization parameter needs to be adjusted or not, and the predicted time point corresponds to the time point when the weight update iteration is completed; and step 802: determining the corresponding target iteration interval according to the variation trend value of the point position parameter.

It should be emphasized that the technical scheme shown in FIG. 6 for determining the target iteration interval of the quantization parameter based on the variation trend value of the point position parameter is applicable to the technical scheme shown in FIG. 7, which will not be described further. For the technical scheme shown in FIG. 8, the quantization parameter is preferably a point position parameter.

It should be noted that the above determination methods of the target iteration interval of the data bit width and the target iteration interval of the quantization parameter are only a partial, not exhaustive, list of examples. Those of ordinary skill in the art may make modifications or variations within the spirit and principle of the disclosure. For example, the method of determining the target iteration interval of the quantization parameter after determining the target iteration interval of the data bit width is also suitable for the technical schemes shown in FIG. 6, FIG. 7, and FIG. 8. As long as functions and technical effects realized by the modifications or variations are similar to those of the present disclosure, the modifications or variations shall fall within the scope of protection of the present disclosure.

The present technical scheme, which is used to determine a quantization parameter, to adjust a data bit width or the quantization parameter according to a quantization error, and to determine a target iteration interval which determines whether to adjust the data bit width or the quantization parameter, makes it possible to adjust the data bit width or the quantization parameter at an appropriate time point in the process of neural network operation, so as to use an appropriate quantization parameter at an appropriate iteration time point. Therefore, an artificial intelligence processor chip may achieve the speed of performing a fixed-point computation when performing a neural network operation, and improve peak computation power of an artificial intelligence processor chip while simultaneously ensuring precision of floating-point computation required for computation.

It should be noted that, for the sake of simple description, the above examples of methods are described as a series of action combinations, but those skilled in the art would understand that the present disclosure is not intended to be limited by the described order of action, as according to the disclosure, certain steps may be performed in other orders or at the same time. Those skilled in the art would also understand that the examples described in the specification are alternative examples and that the actions and modules involved may not be necessary for this disclosure.

It should be further noted that although each step in the flow charts of FIG. 2, FIG. 6, FIG. 7, and FIG. 8 is shown in an order indicated by arrows, the steps are not necessarily performed in the order indicated by the arrows. Unless explicitly stated, there are no strict restrictions on the performing order of the steps, and the steps can be performed in other orders not described. Moreover, at least some of the steps in FIG. 2, FIG. 6, FIG. 7, and FIG. 8 may include multiple sub-steps or stages, in which the multiple sub-steps or stages may not necessarily be completed at the same time but completed at different times, and may not necessarily be performed sequentially but performed alternately or by turns with other steps or sub-steps or at least part of stages.

Figure 9:
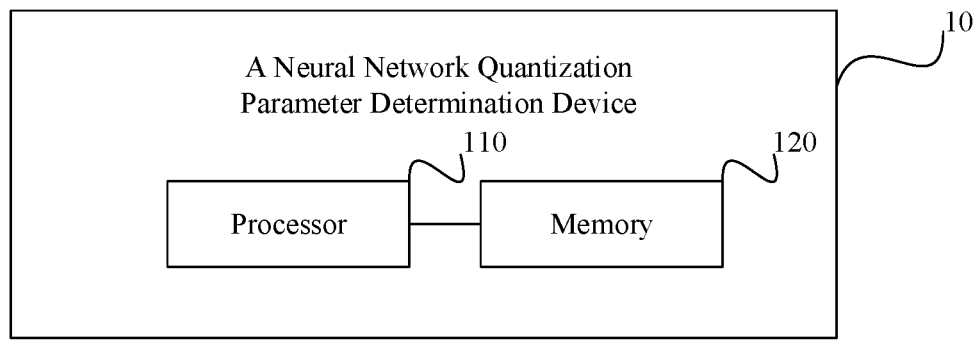
FIG. 9 is a block diagram of hardware configuration of a neural network quantization parameter determination device according to an example of the present disclosure.

As shown in FIG. 9, FIG. 9 is a block diagram of hardware configuration of a neural network quantization parameter determination device according to an example of the present disclosure. In FIG. 9, a neural network quantization parameter determination device 10 may include a processor 110 and a memory 120. It should be noted that in FIG. 9, only elements related to the present disclosure are shown in the neural network quantization parameter determination device 10. Therefore, it is apparent to those skilled in the art that the neural network quantization parameter determination device 10 may further include common elements different from those shown in FIG. 10, such as a fixed-point computation unit.

The neural network quantization parameter determination device 10 may correspond to a computing device with various processing functions, such as generating a neural network, training or learning a neural network, quantizing a floating-point neural network into a fixed-point neural network, or retraining a neural network. For example, the neural network quantization parameter determination device 10 may be implemented as various types of devices, such as a personal computer (PC), a server device, a mobile device, and the like.

The processor 110 is configured to control all functions of the neural network quantization parameter determination device 10. For example, the processor 110 controls the functions of the neural network quantization parameter determination device 10 by performing a program stored in the memory 120 on the neural network quantization parameter determination device 10. The processor 110 may be implemented by a central processing unit (CPU), a graphics processing unit (GPU), an application processor (AP), an artificial intelligence processor chip (IPU), and the like provided by the neural network quantization parameter determination device 10. However, the disclosure is not limited thereto.

The memory 120 is a hardware configured to store various data processed in the neural network quantization parameter determination device 10. For example, the memory 120 may store processed data and data to be processed in the neural network quantization parameter determination device 10. The memory 120 may further store a processed data set or a data set to be processed involved in the process of a neural network operation performed by the processor 110, such as untrained initial neural network data, intermediate neural network data generated in the training process, neural network data which has completed all trainings, quantized neural network data, and the like. In addition, the memory 120 can store applications, drivers, and the like that are driven by the neural network quantization parameter determination device 10. For example, the memory 120 can store various programs related to a training algorithm and a quantization algorithm of the neural network to be performed by the processor 110. The memory 120 may be a DRAM, but the disclosure is not limited thereto. The memory 120 may include at least one of a volatile memory or a non-volatile memory. The non-volatile memory may include a read-only memory (ROM), a programmable ROM (PROM), an electrically programmable ROM (EPROM), an electrically erasable programmable ROM (EEPROM), a flash memory, a phase change random-access memory (PRAM), a magnetic RAM (MRAM), a resistive RAM (RRAM), a ferroelectric RAM (FeRAM), and the like. The volatile memory may include a dynamic RAM (DRAM), a static RAM (SRAM), a synchronous DRAM (SDRAM), PRAM, MRAM, RRAM, the ferroelectric RAM (FeRAM), and the like. In examples, the memory 120 may include at least one of a hard disk drive (HDD), a solid-state drive (SSD), a compact flash memory (CF), a secure digital (SD) card, a micro-secure digital (Micro-SD) card, a mini-secure digital (Mini-SD) card, an extreme digital (xD) card, a cache, or a memory stick.

The processor 110 may generate a trained neural network by repeatedly training (learning) a given initial neural network. Parameters of the initial neural network may be in a high-precision data representation format, such as a data representation format with a precision of 32-bit floating-point, while ensuring the processing precision of the neural network. The parameters may include various types of data input/output to/from the neural network, such as an input/output neuron, a weight, a bias, and the like. Compared with a fixed-point computation, a floating-point computation requires a relatively large number of computations and relatively frequent memory access. For example, most of the computations required for a neural network processing are known as convolution computations. Therefore, in a mobile device with relatively low processing performance (such as a smart phone, a tablet, a wearable device, an embedded device, and the like), a neural network high-precision data computation may make resources of a mobile device underutilized. As a result, in order to drive the neural network computation within an allowable range of precision loss and reduce the amount of computation in the above-mentioned devices, the high-precision data involved in the neural network computation can be quantized and converted into low-precision fixed-point numbers.

In view of the processing performance of a device deployed with a neural network such as a mobile device or an embedded device, the neural network quantization parameter determination device 10 may convert parameters of a trained neural network into fixed-point quantization with a specific number of bits, and the neural network quantization parameter determination device 10 sends a corresponding quantization parameter to the device deployed with the neural network, so that the training, fine-tuning, and other operations performed by the artificial intelligence processor chip is a fixed-point computation. The device deployed with a neural network may be an autonomous vehicle, a robot, a smart phone, a tablet device, an augmented reality (AR) device, an Internet of Things (IoT) device, and the like which uses the neural network to perform voice recognition, image recognition, and the like, but the present disclosure is not limited thereto.

The processor 110 obtains data from the memory 120 in the process of neural network operation. The data includes at least one type of neurons, weights, biases, and gradients. A corresponding quantization parameter is determined by using the technical scheme shown in FIG. 2, and the target data in the process of neural network operation is quantized by using the quantization parameter to obtain quantized data. Then a neural network operation is performed on the quantized data, in which the operation includes but is not limited to training, fine-tuning, and inference.

Figure 8:
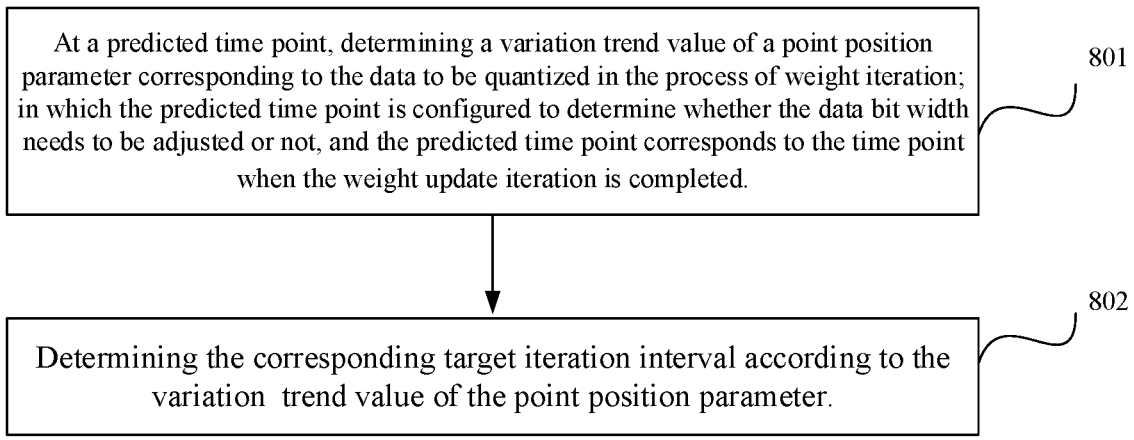
FIG. 8 is still another flow chart illustrating a target iteration interval determination method according to an example of the present disclosure.

The processor 110 adjusts the data bit width n according to the quantization error $\text{diff}_{bit}$, and the processor 110 may determine the target iteration interval of the data bit width or the target iteration interval of the quantization parameter by executing the determination methods of a target iteration interval shown in FIG. 6, FIG. 7, and FIG. 8.

In summary, with respect to the neural network quantization parameter determination device in the examples of the specification, specific functions of the memory 120 and the processor 110 can be explained by referring to preceding examples in the specification, and may achieve the technical effects of the preceding examples, which will not be described further.

For example, the processor 110 may be implemented in any appropriate manner. For example, the processor 110 may adopt a form such as a microprocessor, a processor, a computer-readable medium storing computer-readable program codes (such as software or firmware) which can be executed by the (micro)processor, a logic gate, a switch, an application specific integrated circuit (ASIC), a programmable logic controller, an embedded microcontroller, and the like.

Figure 10:
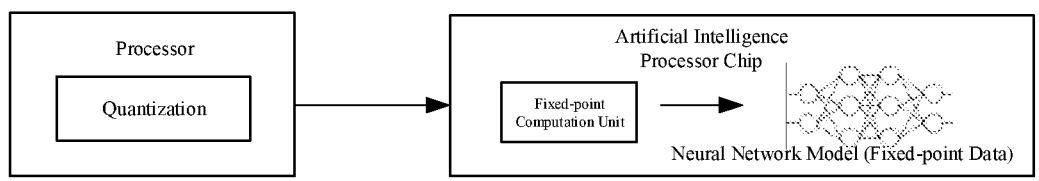
FIG. 10 is an application schematic diagram of a neural network quantization parameter determination device applied to an artificial intelligence processor chip according to an example of the present disclosure.

As shown in FIG. 10, FIG. 10 is an application schematic diagram of a neural network quantization parameter determination device applied to an artificial intelligence processor chip according to an example of the present disclosure. Referring to FIG. 10, as described above, in the neural network quantization parameter determination device 10 such as a PC and a server, the processor 110 performs a quantization operation and quantizes floating-point data involved in the neural network operation into fixed-point data, and the fixed-point data obtained by the quantization is used by a fixed-point computation unit on an artificial intelligence processor chip to perform training, fine-tuning, or inference. The artificial intelligence processor chip is a specific hardware configured to drive the neural network. Since the artificial intelligence processor chip is implemented with relatively low power or performance, low-precision fixed-point data is used to implement the neural network operation according to the technical scheme. Compared with high-precision data, a memory bandwidth required to read low-precision fixed-point data may be smaller, and the caches of the artificial intelligence processor chip may be better used to avoid a bottleneck of memory access. At the same time, when an SIMD instruction is executed on the artificial intelligence chip, more computations may be realized in one clock cycle, which may achieve faster neural network operations.

Furthermore, for a fixed-point computation and a high-precision data computation with a same length, a floating-point computation is more complex than the fixed-point computation and requires more logic components to compose a floating-point computation unit. Therefore, in terms of volume, the floating-point computation unit is larger than the fixed-point computation unit. Moreover, the floating-point computation unit requires more resources to process, and the power gap between the fixed-point computation unit and the floating-point computation unit is usually an order of magnitude.

In summary, the technical scheme may replace a floating-point computation unit with a fixed-point computation unit on an artificial intelligence processor chip, so as to lower power consumption of an artificial intelligence processor chip. This is important for mobile devices. In other words, the technical scheme disclosed herein opens the door to a large number of embedded systems that do run floating-point computing codes efficiently, thus making it possible for the Internet of Things to be widely used in the world.

In the technical scheme, an artificial intelligence processor chip may correspond to, for example, a neural processing unit (NPU), a tensor processing unit (TPU), a neural engine, and the like, which are specific chips for driving a neural network, but the present disclosure is not limited thereto.

In the technical scheme, an artificial intelligence processor chip may be implemented in a separate device independent of the neural network quantization parameter determination device 10, and the neural network quantization parameter determination device 10 may also be implemented as a part of the functional modules of the artificial intelligence processor chip, but the present disclosure is not limited thereto.

In the technical scheme, the operating system of a general-purpose processor (such as CPU) generates an instruction based on the present technical scheme, and then sends the generated instruction to an artificial intelligence processor chip (such as GPU). The artificial intelligence processor chip performs an instruction operation to determine a neural network quantization parameter and perform quantization. In another application, the general-purpose processor directly determines the corresponding quantization parameter based on the present technical scheme, and directly quantizes corresponding target data according to the quantization parameter. An artificial intelligence processor chip performs a fixed-point computation by using quantized data. Furthermore, the general purpose processor (such as CPU) and the artificial intelligence processor chip (such as GPU) may perform a pipelining operation. The operating system of the general purpose processor (such as CPU) generates an instruction based on the present technical scheme, and copies the target data while the artificial intelligence processor chip (such as GPU) performs a neural network operation, which may cut down some of the computing time. But the present disclosure is not limited thereto.

An example of the present disclosure also provides a readable storage medium, on which a computer program is stored, and when the computer program is executed, the quantization parameter determination method of the neural network is realized.

It can be seen that in the process of neural network operation, a quantization parameter is determined during quantization by using the technical scheme disclosed in the present disclosure. The quantization parameter is used by an artificial intelligence processor to quantize data involved in the process of neural network operation and convert high-precision data into low-precision fixed-point data, which may reduce storage space of the data involved in the process of neural network operation. For example, conversion of float32 to fix8 may reduce a model parameter by four times. Smaller data storage space enables neural network deployment to occupy smaller space, which enables on-chip memory of an artificial intelligence processor chip to store more data, and reduces memory access in the artificial intelligence processor chip and improves computing performance.

Those of ordinary skill in the art also know that besides implementing a client and a server in the form of pure computer readable program codes, the client and the server may also achieve the same functions in the form of a logic gate, a switch, a specific integrated circuit, a programmable logic controller, and an embedded microcontroller by means of performing logic programming on method steps. Therefore, the client and the server can be considered as a hardware component, and devices included in the client and the server which are used to realize various functions can be considered as a structure within the hardware component, or considered as either a software module used to implement a method or a structure within the hardware component.

Figure 11:
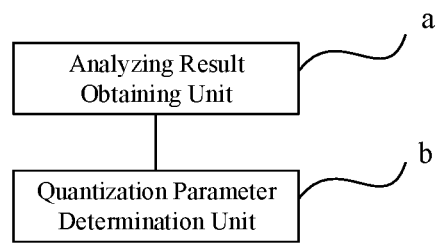
FIG. 11 is a functional block diagram of a neural network quantization parameter determination device according to an example of the present disclosure.

As shown in FIG. 11, FIG. 11 is a functional block diagram of a neural network quantization parameter determination device according to an example of the present disclosure. The device includes:

an analyzing result obtaining unit configured to obtain an analyzing result of each type of the data to be quantized, in which the data to be quantized includes at least one type of neurons, weights, gradients, and biases of the neural network; and a quantization parameter determination unit configured to determine a corresponding quantization parameter according to the analyzing result of each type of data to be quantized and data bit width, wherein the quantization parameter is used by an artificial intelligence processor to perform corresponding quantization on data involved in a process of neural network operation.

Alternatively, the neural network quantization parameter determination device further includes:

a first quantization unit configured to quantize the data to be quantized by using a corresponding quantization parameter.

Alternatively, the neural network quantization parameter determination device further includes:

a second quantization unit configured to quantize target data by using a corresponding quantization parameter, wherein one or more features of the target data is similar to that of the data to be quantized.

In an example, the neural network operation process includes at least one operation of neural network training, neural network inference, and neural network fine-tuning.

In an example, the analyzing result obtained by the analyzing unit is a maximum value and a minimum value of each type of the data to be quantized.

In an example, the analyzing result obtained by the analyzing unit is a maximum absolute value of each type of the data to be quantized.

In an example, the analyzing unit determines the maximum absolute value according to the maximum value and the minimum value of each type of the data to be quantized.

In an example, the quantization parameter determination unit determines a quantization parameter according to the maximum value and the minimum value of each type of the data to be quantized and the data bit width.

In an example, the quantization parameter determination unit determines the quantization parameter according to the maximum absolute value and the data bit width of each type of the data to be quantized.

In an example, the quantization parameter determined by the quantization parameter determination unit is a point position parameter or a first scaling coefficient.

In an example, the quantization parameter determining unit determines the first scaling coefficient according to the point position parameter and a second scaling coefficient, wherein the point position parameter used in determining the first scaling coefficient is a known fixed value, or a result of multiplying the point position parameter and the corresponding second scaling coefficient is used as the first scaling coefficient as a whole to be applied to data quantization in the process of neural network operation.

In an example, the quantization parameter determined by the quantization parameter determination unit includes the point position parameter and the second scaling coefficient.

In an example, the quantization parameter determination unit determines the second scaling coefficient according to the point position parameter, the analyzing result, and the data bit width.

In an example, the quantization parameter determined by the quantization parameter determination unit further includes an offset.

In an example, the quantization parameter determination unit determines the offset according to the analyzing result of each type of the data to be quantized.

In an example, the data bit width used by the quantization parameter determination unit is a preset value.

In an example, the quantization parameter determination unit includes an adjustment module and a quantization error determination module.

The adjustment module is configured to adjust the data bit width according to the corresponding quantization error, and the quantization error determination module is configured to determine the quantization error according to the quantized data and the corresponding pre-quantized data.

In an example, the adjustment module is specifically configured to:

compare the quantization error with a threshold to obtain a comparison result, and adjust the data bit width according to the comparison result, in which the threshold includes at least one of a first threshold and a second threshold.

In an example, the adjustment module includes a first adjustment submodule. The first adjustment submodule is configured to if the quantization error is greater than or equal to the first threshold, increase the data bit width.

In an example, the adjustment module includes a second adjustment submodule. The second adjustment submodule is configured to, if the quantization error is less than or equal to the second threshold, reduce the data bit width.

In an example, the adjustment module includes a third adjustment submodule. The third adjustment submodule is configured to, if the quantization error is between the first threshold and the second threshold, keep the data bit width unchanged.

In an example, the quantization error determination module includes:

a quantization interval determination submodule configured to determine a quantization interval according to the data bit width; and a first quantization error determination submodule configured to determine the quantization error according to the quantization interval, the number of the quantized data, and the corresponding pre-quantized data.

In an example, the quantization error determination module includes:

an inverse quantization data determination submodule configured to perform inverse quantization on the quantized data to obtain inverse quantized data, where the data format of the inverse quantized data is the same as that of the corresponding pre-quantized data; and a second quantization error determination submodule configured to determine the quantization error according to the quantized data and the corresponding inverse quantized data.

In an example, the pre-quantized data used by the quantization error determination module is the data to be quantized.

In an example, the pre-quantized data used by the quantization error determination module is the data to be quantized involved in the weight update iteration process within a target iteration interval, where the target iteration interval includes at least one weight update iteration and the same data width is used in the quantization process within the same target iteration interval.

In an example, the neural network quantization parameter determination device further includes a first target iteration interval determination unit, in which the first target iteration interval determination unit includes:

a first variation trend value determination module configured to determine a variation trend value of a point position parameter of the data to be quantized involved in the weight update iteration process at a predicted time point, wherein the predicted time point is used to determine whether the data bit width needs to be adjusted or not, and the predicted time point corresponds to a time point when the weight update iteration is completed; and a first target iteration interval module configured to determine a corresponding target iteration interval according to the variation trend value of the point position parameter.

In an example, the first target iteration interval determination unit includes:

a second variation trend value determination module configured to determine a variation trend value of a point position parameter and a variation trend value of data bit width involved in a weight update iteration process at a predicted time point, wherein the predicted time point is used to determine whether the data bit width needs to be adjusted, and the predicted time point corresponds to a time point when the weight update iteration is completed; and a second target iteration interval module configured to determine the corresponding target iteration interval according to the variation trend value of the point position parameter and the variation trend value of the data bit width.

In an example, the first target iteration interval determination unit further includes a first predicted time point determination unit, wherein the first predicted time point determination unit is configured to determine the first predicted time point according to the target iteration interval.

In an example, the first target iteration interval determination unit further includes a second predicted time point determination unit, in which the second predicted time point determination unit is configured to determine a second predicted time point according to the curve of data variation range, in which the curve of data variation range is obtained by analyzing the data variation range in the process of weight update iteration.

In an example, both the first variation trend value determination module and the second variation trend value determination module determine the variation trend value of the point position parameter according to a moving average value of a point position parameter corresponding to a current predicted time point and a moving average value of a point position parameter corresponding to a previous predicted time point.

In an example, both the first variation trend value determination module and the second variation trend value determination module determine the variation trend value of the point position parameter according to the point position parameter corresponding to the current predicted time point and the moving average value of the point position parameter corresponding to the previous predicted time point.

In an example, both the first variation trend value determination module and the second variation trend value determination module include:

a determination submodule of a point position parameter corresponding to a current predicted time point configured to determine the point position parameter corresponding to the current predicted time point according to a point position parameter corresponding to a previous predicted time point and an adjusted value of the data bit width;

an adjusted result determination submodule configured to adjust the moving average value of the point position parameter corresponding to the previous predicted time point according to the adjusted value of the data bit width to obtain an adjusted result; and a first moving average value determination submodule configured to determine the moving average value of the point position parameter corresponding to the current predicted time point according to the point position parameter corresponding to the current predicted time point and the adjusted result.

In an example, both the first variation trend value determination module and the second variation trend value determination module include:

an intermediate result determination submodule configured to determine an intermediate result of the moving average value of the point position parameter corresponding to the current predicted time point according to the point position parameter corresponding to the previous predicted time point and the moving average value of the point position parameter corresponding to the previous predicted time point; and a second moving average value determination submodule configured to determine the moving average value of the point position parameter corresponding to the current predicted time point according to the intermediate result of the moving average value of the point position parameter corresponding to the current predicted time point and the adjusted value of the data bit width.

In an example, the second variation trend value determination module is configured to determine a variation trend value of data bit width according to the corresponding quantization error.

In an example, the first target iteration interval determination unit further includes:

a quantization error determination module configured to determine a corresponding quantization error, in which the quantized data corresponding to the quantization error is the data to be quantized involved in the weight update iteration process corresponding to the predicted time point; and a data bit width determination module configured to determine the data bit width used in the quantization within the target iteration interval according to the corresponding quantization error.

In an example, the data bit width determination module is specifically configured to:

compare the quantization error with a threshold to obtain a comparison result, and adjust the data bit width used in the quantization within a previous target iteration interval according to the comparison result to obtain an adjusted result, in which the adjusted result includes the data bit width used in the quantization within the current target iteration interval.

In an example, the pre-quantized data used by the quantization error determination module is the data to be quantized involved in the weight update iteration within the target iteration interval, in which the target iteration interval includes at least one weight update iteration, and the same quantization parameter is used in the quantization within the same target iteration interval.

In an example, the neural network quantization parameter determination device further includes a second target iteration interval determination unit, in which the second target iteration interval determination unit includes:

a third variation trend value determination module configured to determine a variation trend value of a point position parameter of data to be quantized in the weight update iteration at a predicted time point, in which the predicted time point is when the determination of whether the quantization parameter needs to be adjusted or not is made, and the predicted time point corresponds to a time point when the weight update iteration is completed; and a third target iteration interval module configured to determine the corresponding target iteration interval according to the variation trend value of the point position parameter.

In an example, the quantization parameter determination unit determines the point position parameter according to an analyzing result and the data bit width.

It should be understood that the described device examples are merely illustrative and can be implemented in other manners. For instance, division of the unit/module is only a logical function division and can be divided in other manners during actual implementations. For another example, a plurality of units, modules, or components may be combined or integrated into another system, or some features may be ignored, or not performed.

The units or modules described as separate components may or may not be physically separated and the components illustrated as units or modules may or may not be physical units, which means that the units or the components may be in the same place or may be distributed among a plurality of network units. All or part of the units may be selected according to actual needs to achieve the purpose of the technical solutions of the examples.

In addition, unless otherwise specified, functional units/modules in various examples of the present disclosure may be integrated into one unit/module, or each unit/module may be physically present, or two or more units/modules may be integrated into one unit/module. The above-mentioned integrated unit/module can be implemented in the form of hardware or a software program module.

It should be understood that the described device examples are merely illustrative and can be implemented in other manners; for instance, division of the unit/module is only a logical function division and can be divided in other manners during actual implementations, for example, a plurality of units, modules, or components may be combined or integrated into another system, or some features may be ignored, or not performed.

The units or modules described as separate components may or may not be physically separated and the components illustrated as units or modules may or may not be physical units, which means that the units or the components may be in the same place or may be distributed to a plurality of network units. All or part of the units may be selected according to actual needs to achieve the purpose of the technical solutions of the examples.

In addition, unless otherwise specified, functional units/modules in various examples of the present disclosure may be integrated into one unit/module, or each unit/module may be physically present, or two or more units/modules may be integrated into one unit/module. The above-mentioned integrated unit/module can be implemented in the form of hardware or a software program module.

When the integrated unit/module is implemented in the form of hardware, the hardware may be a digital circuit, an analogue circuit, and the like. Physical implementation of a hardware structure includes, but is not limited to, a transistor, a memristor, and the like. Unless otherwise specified, the artificial intelligence processor may be any appropriate hardware processor, for example, a CPU, a graphics processing unit (GPU), a field-programmable gate array (FPGA), a digital signal processor (DSP), and an application specific integrated circuit (ASIC). Unless otherwise specified, the storage unit may be any appropriate magnetic storage medium or magneto-optical storage medium, for example, a resistive random-access memory (RRAM), a dynamic random-access memory (DRAM), a static random-access memory (SRAM), an enhanced dynamic random-access memory (EDRAM), a high-bandwidth memory (HBM), and a hybrid memory cube (HMC).

The integrated unit/module may be stored in a computer-readable memory, for example, non-transitory computer-readable memory such as DRAM, SRAM, RRAM, etc., when implemented in the form of a software program module and is sold or used as a separate product. Based on such understanding, the technical schemes of the present disclosure essentially, or the part of the technical schemes that contributes to the related art, or all or part of the technical solutions, may be embodied in the form of a software product which is stored in a memory and includes instructions for causing a computer device (which may be a personal computer, a server, or a network device and so on) to perform all or part of the steps described in the various examples of the present disclosure. The memory includes various medium capable of storing program codes, such as a USB (universal serial bus) flash disk, a read-only memory (ROM), a random access memory (RAM), a removable hard disk, Disk, compact disc (CD), or the like.

In the present technical scheme, the present disclosure further discloses an artificial intelligence chip, which includes the neural network quantization parameter determination device.

In the present technical scheme, the disclosure further discloses a board card, which includes a memory device, an interface device, a controller device, and the artificial intelligence chip, in which the artificial intelligence chip is connected with the memory device, the controller device, and the interface device respectively; the memory device is configured to store data; the interface device is configured to transmit data between the artificial intelligence chip and an external equipment; and the control device is configured to monitor a state of the artificial intelligence chip.

Figure 12:
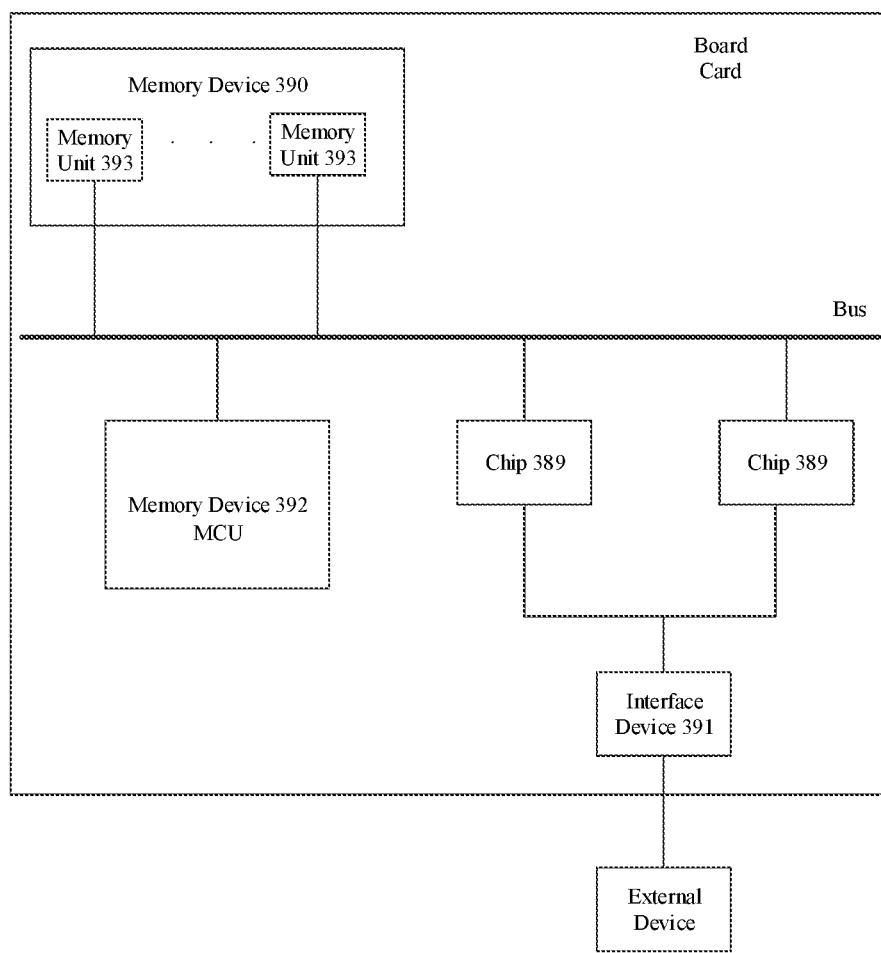
FIG. 12 is a structural block diagram of a board card according to an example of the present disclosure.

FIG. 12 is a structural block diagram of a board card according to an example of the present disclosure. Referring to FIG. 12, the board card may include other support components besides a chip 389, in which the other support components include but are not limited to: a memory device 390, an interface device 391, and a control device 392;

the memory device 390 is connected with the artificial intelligence chip by a bus and is configured to store data. The memory device 390 may include a plurality of storage units 393. Each group of the storage unit is connected with the artificial intelligence chip by a bus. It is understandable that, in some embodiments, each group of the storage unit can be a double data rate SDRAM (DDR SDRAM).

The DDR may increase a speed of SDRAM by multiple times without increasing a clock frequency, and allow data to be read at a rising edge and a falling edge of a clock pulse. The speed of DDR is twice as fast as that of standard SDRAM. In an example, the storage device may include four groups of the storage units. Each group of the storage unit may include a plurality of DDR4 particles (chips). In an example, the artificial intelligence chip may include four 72-bit DDR4 controllers. In the 72-bit DDDR4 controllers, 64 bit is used for data transmission and 8 bit is used for ECC verification. It is understandable that a theoretical bandwidth of data transmission may reach 25600 MB/s when DDR4-3200 particles are used in each group of the storage units.

In an example, each group of the storage units may include a plurality of DDR SDRAMs which may be set in parallel. The DDR can transmit data twice in a clock cycle. A controller for controlling DDR is set in the chip for controlling data transmission and data storage of each storage unit.

The interface device is electrically connected with the artificial intelligence chip. The interface device is configured to conduct data transmission between the artificial intelligence chip and an external device (such as a server or a computer). In an example, the interface device may be a standard PCIE interface. For example, data to be processed is transmitted to the chip by the server through the standard PCIE interface to realize data transmission. In another example, when a PCIE 3.0X 16 interface is used for transmission, the theoretical bandwidth may reach 16000 MB/s. In another example, the interface device may be other interfaces, and the present disclosure is not intended to limit specific representations of interfaces, as long as the interface unit can achieve data transmission. In addition, the computation result of the artificial intelligence chip may be transmitted back to the external device (such as the server) by the interface device.

The control device is electrically connected with the artificial intelligence chip. The control device is configured to monitor the state of the artificial intelligence chip. For example, the artificial intelligence chip and the control device can be electrically connected through an SPI interface. The control device may include a microcontroller unit (MCU). The artificial intelligence chip may include multiple processing chips, multiple processing cores, or multiple processing circuits, all of which may drive multiple loads. Therefore, the artificial intelligence chip may work under different working states such as multi-load and light-load. The control device may be capable of regulating the working states of the multiple processing chips, the multiple processing chips, and the multiple processing circuits in the artificial intelligence chip.

Another example of the disclosure provides an electronic device that comprises the artificial intelligence chip. The electronic device includes a data processing device, a robot, a computer, a printer, a scanner, a tablet computer, an intelligent terminal, a mobile phone, a drive recorder, a navigator, a sensor, a webcam, a cloud server, a camera, a video camera, a projector, a watch, an earphone, a mobile storage, a wearable device, a transportation means, a household electrical appliance, and/or a medical device.

The transportation means includes an airplane, a ship, and/or a vehicle; the household electrical appliance includes a television, an air conditioner, a microwave oven, a refrigerator, an electric rice cooker, a humidifier, a washing machine, an electric lamp, a gas cooker, and a range hood; and the medical device includes a nuclear magnetic resonance spectrometer, a B-ultrasonic scanner, and/or an electrocardiograph.

The foregoing may be better understood according to following articles:

A1. A neural network quantization parameter determination method that includes:

obtaining an analyzing result of each type of the data to be quantized, in which the data to be quantized includes at least one type of neurons, weights, gradients, and biases of the neural network; and determining a corresponding quantization parameter according to the analyzing result of each type of data to be quantized and data bit width, in which the quantization parameter is used by an artificial intelligence processor to perform corresponding quantization on data involved in a process of neural network operation.

A2. The method of article A1, in which the method further includes:

quantizing the data to be quantized by using a corresponding quantization parameter.

A3. The method of article A1 or article A2, in which the method further includes:

quantizing target data by using a corresponding quantization parameter, in which a feature of the target data is similar to that of the data to be quantized.

A4. In the method of article A1, the neural network operation process includes at least one operation of neural network training, neural network inference, and neural network fine-tuning.

A5. In the method of article A1, the analyzing result is a maximum value and a minimum value of each type of data to be quantized.

A6. In the method of article A1, the analyzing result is a maximum absolute value of each type of data to be quantized.

A7. In the method of article A6, the maximum absolute value is determined according to the maximum value and the minimum value of each type of data to be quantized.

A8. In the method of article A5, the quantization parameter is determined according to the maximum value of each type of data to be quantized, the minimum value of each type of data to be quantized, and the data bit width.

A9. In the method of article A6 or article A7, the quantization parameter is determined according to the maximum absolute value of each type of data to be quantized and the data bit width.

A10. In the method of Article A1, the quantization parameter is a point position parameter or a first scaling coefficient.

A11. In the method of article A10, the first scaling coefficient is determined according to the point position parameter and a second scaling coefficient, in which the point position parameter used in determining the first scaling coefficient is a known fixed value, or a result of multiplying the point position parameter and the corresponding second scaling coefficient is taken as the first scaling coefficient as a whole to be applied to data quantization in the process of neural network operation.

A12. In the method of article A10, the quantization parameter determined by the quantization parameter determination unit includes the point position parameter and the second scaling coefficient.

A13. In the method of article A12, the second scaling coefficient is determined according to the point position parameter, the analyzing result, and the data bit width.

A14. In the method of any of article A10 to article A12, the quantization parameter further includes an offset.

A15. In the method of article A14, the offset is determined according to the analyzing result of each type of the data to be quantized.

A16. In the method of article A1, the data bit width is a preset value.

A17. In the method of article A1, the data bit width is adjusted according to the corresponding quantization error, in which the quantization error is determined according to the quantized data and corresponding pre-quantized data.

A18. In the method of article A17, steps of adjusting the data bit width include:

comparing the quantization error with a threshold to obtain a comparison result, and adjusting the data bit width according to the comparison result, in which the threshold includes at least one of a first threshold and a second threshold.

A19. In the method of article A18, steps of adjusting the data bit width include:

increasing the data bit width if the quantization error is greater than or equal to the first threshold.

A20. In the method of article A18, steps of adjusting the data bit width include:

reducing the data bit width if the quantization error is less than or equal to the second threshold.

A21. In the method of article A18, steps of adjusting the data bit width include:

remaining the data bit width unchanged if the quantization error is between the first threshold and the second threshold.

A22. In the method of article A17, a method of obtaining the quantization error includes:

determining a quantization interval according to the data bit width; and determining the quantization error according to the quantization interval, the number of the quantized data, and the corresponding pre-quantized data.

A23. In the method of article A17, a method of obtaining the quantization error includes:

performing inverse quantization on the quantized data to obtain inverse quantized data, in which a data format of the inverse quantized data is the same as that of the corresponding pre-quantized data; and determining the quantization error according to the quantized data and the corresponding inverse quantized data.

A24. In the method of article A17, the pre-quantized data is the data to be quantized.

A25. In the method of article A17, the pre-quantized data is data to be quantized involved in weight update iteration within a target iteration interval, in which the target iteration interval includes at least one weight update iteration, and the same data bit width is used in the quantization process within the same target iteration interval.

A26. In the method of article A25, the determining the target iteration interval includes:

at a predicted time point, determining a variation trend value of a point position parameter of data to be quantized involved in the weight update iteration, in which the predicted time point is used to determine whether the data bit width needs to be adjusted or not, and the predicted time point corresponds to the time point when the weight update iteration is completed; and determining the corresponding target iteration interval according to the variation trend value of the point position parameter.

A27. In the method of article A25, the determining the target iteration interval includes:

at a predicted time point, determining a variation trend value of a point position parameter and a variation trend value of data bit width corresponding to the data to be quantized involved in the weight iteration process, in which the predicted time point is used to determine whether the data bit width needs to be adjusted or not, and the predicted time point corresponds to the time point when the weight update iteration is completed; and determining the corresponding target iteration interval according to the variation trend value of the point position parameter and the variation trend value of the data bit width.

A28. In the method of article A26 or article A27, the predicted time point includes a first predicted time point, in which the first predicted time point is determined according to the target iteration interval.

A29. In the method of article A28, the predicted time point further includes a second predicted time point, in which the second predicted time point is determined according to a curve of data variation range, and the curve of data variation range is obtained by analyzing the data variation range in the process of weight update iteration.

A30. In the method of any of article A26 to article A29, the variation trend value of the point position parameter is determined according to a moving average value of the point position parameter corresponding to a current predicted time point and a moving average value of the point position parameter corresponding to a previous predicted time point.

A31. In the method of any of article A26 to article A29, the variation trend value of the point position parameter is determined according to the point position parameter corresponding to the current predicted time point and the moving average value of the corresponding point position parameter corresponding to the previous predicted time point.

A32. In the method of article A30, the determining a moving average value of a point position parameter corresponding to the current predicted time point includes:

determining the point position parameter corresponding to the current predicted time point according to a point position parameter corresponding to a previous predicted time point and an adjusted value of the data bit width;

adjusting a moving average value of a point position parameter corresponding to the previous predicted time point according to the adjusted value of the data bit width to obtain an adjusted result; and determining the moving average value of the point position parameter corresponding to the current predicted time point according to the point position parameter corresponding to the current predicted time point and the adjusted result.

A33. In the method of article A30, the determining the moving average value of the point position parameter corresponding to the current predicted time point includes:

determining an intermediate result of the moving average value of the point position parameter corresponding to the current predicted time point according to the point position parameter corresponding to the previous predicted time point and the moving average value of the point position parameter corresponding to the previous predicted time point; and determining the moving average value of the point position parameter corresponding to the current predicted time point according to the intermediate result of the moving average value of the point position parameter corresponding to the current predicted time point and the adjusted value of the data bit width.

A34. In the method of article A27, the variation trend value of the data bit width is determined according to the corresponding quantization error.

A35. In the method of any of article A26 to article A29, the determining data bit width used in the quantization process within the target iteration interval includes:

determining a corresponding quantization error, in which pre-quantized data corresponding to the quantization error is the data to be quantized involved in the weight update iteration corresponding to the predicted time point; and determining the data bit width used in the quantization process within the target iteration interval according to the corresponding quantization error.

A36. In the method of article A35, the determining data bit width used in the quantization process within the target iteration interval includes:

comparing the quantization error with the threshold to obtain a comparison result, and adjusting the data bit width used in the quantization process within the previous target iteration interval according to the comparison result to obtain an adjusted result, in which the adjusted result is taken as the data bit width used in the quantization process within a current target iteration interval.

A37. In the method of article A17, the pre-quantized data is the data to be quantized in the weight update iteration within the target iteration interval, in which the target iteration interval includes at least one weight update iteration and the same quantization parameter is used in the quantization process within the same target iteration interval.

A38. In the method of article A37, the determining the target iteration interval includes:

at a predicted time point, determining a variation trend value of a point position parameters of data to be quantized involved in the weight update iteration, in which the predicted time point is used to determine whether the quantization parameter needs to be adjusted or not, and the predicted time point corresponds to the time point when the weight update iteration is completed; and determining the corresponding target iteration interval according to the variation trend value of the point position parameter.

A39. In the method of any of article A10 to article A15, the point position parameter is determined according to the analyzing result and the data bit width.

B40. A neural network quantization parameter determination device including a memory and a processor, in which a computer program that can be run on the processor is stored on the memory, and the processor implements any of the methods described in articles A1 to article A39 when the computer program is executed.

C41. A neural network quantization parameter determination device, in which the device includes:

an analyzing result obtaining unit configured to obtain an analyzing result of each type of the data to be quantized, in which the data to be quantized includes at least one type of neurons, weights, gradients, and biases of the neural network; and a quantization parameter determination unit configured to determine a corresponding quantization parameter according to the analyzing result of each type of data to be quantized and data bit width, in which the quantization parameter is used by an artificial intelligence processor to perform corresponding quantization on data involved in a process of neural network operation.

C42. The device of article C41, in which the neural network quantization parameter determination device further includes:

a first quantization unit configured to quantize the data to be quantized by using a corresponding quantization parameter.

C43. The device of article C41 or article C42, in which the neural network quantization parameter determination device further includes:

a second quantization unit configured to quantize target data by using a corresponding quantization parameter, in which a feature of the target data is similar to that of the data to be quantized.

C44. The device of article C41, in which the analyzing result obtained by the analyzing result obtaining unit is a maximum value and a minimum value of each type of data to be quantized.

C45. The device of article C41, in which the analyzing result obtained by the analyzing result obtaining unit is a maximum absolute value of each type of data to be quantized.

C46. The device of article C45, in which the analyzing result obtaining unit determines the maximum absolute value according to the maximum value and the minimum value of each type of data to be quantized.

C47. The device of article C44, in which the quantization parameter determination unit determines the quantization parameter according to the maximum value of each type of data to be quantized, the minimum value of each type of data to be quantized, and the data bit width.

C48. The device of article C45 or article C46, in which the quantization parameter determination unit determines the quantization parameter according to the maximum absolute value of each type of data to be quantized and the data bit width.

C49. The device of article C41, in which the quantization parameter determined by the quantization parameter determination unit is a point position parameter or a first scaling coefficient.

C50. The device of article C49, in which the quantization parameter determination unit determines the first scaling coefficient according to the point position parameter and a second scaling coefficient, in which the point position parameter used in determining the first scaling coefficient is a known fixed value, or a result of multiplying the point position parameter and the corresponding second scaling coefficient is taken as the first scaling coefficient as a whole to be applied to data quantization in the process of neural network operation.

C51. The device of article C49, in which the quantization parameter determined by the quantization parameter determination unit includes the point position parameter and the second scaling coefficient.

C52. The device of article C51, in which the second scaling coefficient is determined according to the point position parameter, the analyzing result, and the data bit width.

C53. The device of any of article C49 to article C51, in which the quantization parameter further includes an offset.

C54. The device of article C53, in which the offset is determined according to the analyzing result of each type of the data to be quantized.

C55. The device of article C41, in which the data bit width used by the quantization parameter determination unit is a preset value.

C56. The device of article C41, in which the quantization parameter determination unit includes an adjustment module and a quantization error determination module, in which the quantization error determination module is configured to determine the quantization error according to the quantized data and the corresponding pre-quantized data; and the adjustment module is configured to adjust the data bit width according to the corresponding quantization error.

C57. The device of article C56, in which the adjustment module is specifically configured to:

compare the quantization error with a threshold to obtain a comparison result, and adjust the data bit width according to the comparison result, in which the threshold includes at least one of a first threshold and a second threshold.

C58. The device of article C57, in which the adjustment module includes a first adjustment submodule, in which the first adjustment submodule is configured to:

if the quantization error is greater than or equal to the first threshold, increase the data bit width.

C59. The device of article C57, in which the adjustment module includes a second adjustment submodule, in which the second adjustment submodule is configured to:

if the quantization error is less than or equal to the second threshold, reduce the data bit width.

C60. The device of article C57, in which the adjustment module includes a third adjustment submodule, in which the third adjustment submodule is configured to:

if the quantization error is between the first threshold and the second threshold, remain the data bit width unchanged.

C61. The device of article C56, in which the quantization error determination module includes:

a quantization interval determination submodule configured to determine a quantization interval according to the data bit width; and a first quantization error determination submodule configured to determine the quantization error according to the quantization interval, the number of the quantized data, and the corresponding pre-quantized data.

C62. The device of article C56, in which the quantization error determination module includes:

an inverse quantization data determination submodule configured to perform inverse quantization on the quantized data to obtain inverse quantized data, in which a data format of the inverse quantized data is the same as that of the corresponding pre-quantized data; and a second quantization error determination submodule configured to determine the quantization error according to the quantized data and the corresponding inverse quantized data.

C63. The device of article C56, in which the pre-quantized data used by the quantization error determination module is the data to be quantized.

C64. The device of article C56, in which the pre-quantized data used by the quantization error determination module is the data to be quantized involved in the weight update iteration process within a target iteration interval, in which the target iteration interval includes at least one weight update iteration and the same data width is used in the quantization process within the same target iteration interval.

C65. The device of article C64, in which the neural network quantization parameter determination device further includes a first target iteration interval determination unit, in which the first target iteration interval determination unit includes:

a first variation trend value determination module configured to determine a variation trend value of a point position parameter of the data to be quantized involved in the weight update iteration process at a predicted time point, in which the predicted time point is used to determine whether the data bit width needs to be adjusted or not, and the predicted time point corresponds to a time point when the weight update iteration is completed; and a first target iteration interval module configured to determine a corresponding target iteration interval according to the variation trend value of the point position parameter.

C66. The device of article C64, in which the first target iteration interval determination unit includes:

a second variation trend value determination module configured to determine a variation trend value of a point position parameter and a variation trend value of data bit width involved in a weight update iteration process at a predicted time point, in which the predicted time point is configured to determine whether the data bit width needs to be adjusted, and the predicted time point corresponds to a time point when the weight update iteration is completed; and a second target iteration interval module configured to determine the corresponding target iteration interval according to the variation trend value of the point position parameter and the variation trend value of the data bit width.

C67. The device of article C65 or article C66, in which the first target iteration interval determination unit further includes a first predicted time point determination unit, in which the first predicted time point determination unit is configured to determine the first predicted time point according to the target iteration interval.

C68. The device of article C67, in which the first target iteration interval determination unit further includes a second predicted time point determination unit, in which the second predicted time point determination unit is configured to determine a second predicted time point according to the curve of data variation range, in which the curve of data variation range is obtained by analyzing the data variation range in the process of weight update iteration.

C69. The device of any of article C65 to article C68, in which both the first variation trend value determination module and the second variation trend value determination module determine the variation trend value of the point position parameter according to a moving average value of a point position parameter corresponding to a current predicted time point and a moving average value of a point position parameter corresponding to a previous predicted time point.

C70. The device of any of article C65 to article C68, in which both the first variation trend value determination module and the second variation trend value determination module determine the variation trend value of the point position parameter according to the point position parameter corresponding to the current predicted time point and the moving average value of the point position parameter corresponding to the previous predicted time point.

C71. The device of article C69, in which both the first variation trend value determination module and the second variation trend value determination module include:

a determination submodule of a point position parameter corresponding to a current predicted time point configured to determine the point position parameter corresponding to the current predicted time point according to a point position parameter corresponding to a previous predicted time point and an adjusted value of the data bit width;

an adjusted result determination submodule configured to adjust the moving average value of the point position parameter corresponding to the previous predicted time point according to the adjusted value of the data bit width to obtain an adjusted result; and a first moving average value determination submodule configured to determine the moving average value of the point position parameter corresponding to the current predicted time point according to the point position parameter corresponding to the current predicted time point and the adjusted result.

C72. The device of article C69, in which both the first variation trend value determination module and the second variation trend value determination module include:

an intermediate result determination submodule configured to determine an intermediate result of the moving average value of the point position parameter corresponding to the current predicted time point according to the point position parameter corresponding to the previous predicted time point and the moving average value of the point position parameter corresponding to the previous predicted time point; and a second moving average value determination submodule configured to determine the moving average value of the point position parameter corresponding to the current predicted time point according to the intermediate result of the moving average value of the point position parameter corresponding to the current predicted time point and the adjusted value of the data bit width.

C73. The device of article C66, in which the second variation trend value determination module is configured to determine a variation trend value of data bit width according to the corresponding quantization error.

C74. The device of any of article C65 to article C68, in which the first target iteration interval determination unit further includes:

a quantization error determination module configured to determine a corresponding quantization error, in which the quantized data corresponding to the quantization error is data to be quantized involved in the weight update iteration process corresponding to the predicted time point; and a data bit width determination module configured to determine data bit width used in the quantization within the target iteration interval according to the corresponding quantization error.

C75. The device of article C74, in which the data bit width determination module is configured to:

compare the quantization error with a threshold to obtain a comparison result, and adjust data bit width used in the quantization within a previous target iteration interval according to the comparison result to obtain an adjusted result, in which the adjusted result is taken as data bit width used in the quantization within the current target iteration interval.

C76. The device of article C56, in which the pre-quantized data used by the quantization error determination module is the data to be quantized involved in the weight update iteration within the target iteration interval, in which the target iteration interval includes at least one weight update iteration, and the same quantization parameter is used in the quantization within the same target iteration interval.

C77. The device of article C76, in which the neural network quantization parameter determination device further includes a second target iteration interval determination unit, in which the second target iteration interval determination unit includes:

a third variation trend value determination module configured to determine a variation trend value of a point position parameter of data to be quantized in the weight update iteration at a predicted time point, in which the predicted time point is when the determination of whether the quantization parameter needs to be adjusted or not is made, and the predicted time point corresponds to a time point when the weight update iteration is completed; and a third target iteration interval module configured to determine the corresponding target iteration interval according to the variation trend value of the point position parameter.

C78. The device of any of article C49 to article C54, wherein the quantization parameter determination unit determines the point position parameter according to an analyzing result and the data bit width.

D79. A computer readable storage medium, on which a computer program is stored, and the above method is implemented when the computer program is executed.

Examples of the present disclosure has been described above. The above descriptions are merely exemplary rather than exhaustive, and are not intended to be limited in the disclosed examples. It should be noted that those of ordinary skill in the art may make modifications or variations within the spirit and principle of the disclosure. The terms used in the present disclosure are intended to better explain principles and actual applications of the examples, and improvement of prior art, or to make those of ordinary skill in the art understand the examples in the present disclosure.

What is claimed is:

1. A method for determining quantization parameters in a neural network, comprising:

obtaining an analyzing result of each type of data to be quantized, wherein the data to be quantized includes at least one type of data among neurons, weights, gradients, or biases of the neural network; and determining a corresponding quantization parameter according to the analyzing result of each type of the data to be quantized and a data bit width corresponding to the data to be quantized, wherein the quantization parameter is used by an artificial intelligence processor to perform corresponding quantization on data involved in a process of neural network operation; wherein the quantization parameter is a first scaling coefficient and quantizing target data by using the corresponding quantization parameter, wherein a feature of the target data is similar to that of the data to be quantized, wherein the analyzing result is a maximum value and a minimum value of, or a maximum absolute value of, each type of data to be quantized, wherein the maximum absolute value is determined according to the maximum value and the minimum value of each type of data to be quantized, wherein the quantization parameter is determined according to either the maximum value of each type of data to be quantized and the minimum value of each type of data to be quantized, or the maximum absolute value of each type of data, together with the data bit width.

2. The method of claim 1, wherein the neural network operation process includes at least one operation among neural network training, neural network inference, and neural network fine-tuning.

3. The method of claim 1, wherein the first scaling coefficient is determined according to a point position parameter and a second scaling parameter, wherein the point position parameter used in determining the first scaling coefficient is a known fixed value, or a result of multiplying the point position parameter and the corresponding second scaling coefficient is taken as the first scaling coefficient as a whole to be applied to data quantization in the process of neural network operation, and wherein the second scaling coefficient is determined according to the point position parameter, the analyzing result, and the data bit width.

4. The method of claim 1, wherein the data bit width is adjusted according to the corresponding quantization error, wherein the quantization error is determined according to the quantized data and corresponding pre-quantized data, and wherein the adjusting the data bit width includes:
comparing the quantization error with a threshold to obtain a comparison result, and adjust the data bit width according to the comparison result, wherein the threshold includes at least one from the group of a first threshold and a second threshold.

5. The method of claim 4, wherein the adjusting the data bit width includes:
increasing the data bit width if the quantization error is greater than or equal to the first threshold, or
reducing the data bit width if the quantization error is less than or equal to the second threshold, or
remaining the data bit width unchanged if the quantization error is between the first threshold and the second threshold.

6. The method of claim 4, wherein the method for obtaining the quantization error includes:
determining a quantization interval according to the data bit width, and
determining the quantization error according to the quantization interval, the number of the quantized data, and the corresponding pre-quantized data.

7. The method of claim 4, wherein the method for obtaining the quantization error includes:
performing inverse quantization on the quantized data to obtain inverse quantized data, wherein a data format of the inverse quantized data is the same as that of the corresponding pre-quantized data, and
determining the quantization error according to the quantized data and the corresponding inverse quantized data.

8. The method of claim 4, wherein the pre-quantized data is the data to be quantized or the pre-quantized data is data to be quantized involved in weight update iteration within a target iteration interval,
and wherein the target iteration interval includes at least one weight update iteration and a same data bit width is used in the quantization process within a same target iteration interval.

9. The method of claim 8, wherein the target iteration interval is determined by:
at a predicted time point, determining a variation trend value of a point position parameter and a variation trend value of data bit width corresponding to the data to be quantized involved in the weight iteration process, wherein the predicted time point is configured to determine whether the data bit width needs to be adjusted or not, and the predicted time point corresponds to the time point when the weight update iteration is completed, and determining the corresponding target iteration interval according to the variation trend value of the point position parameter and the variation trend value of the data bit width.

10. The method of claim 9, wherein the variation trend value of the point position parameter is determined according to the point position parameter or a moving average value of the point position parameter that corresponds to a current predicted time point and a moving average value of the point position parameter corresponding to a previous predicted time point.

11. The method of claim 8, wherein the target iteration interval is determined by:
at a predicted time point, determining a variation trend value of a point position parameter of data to be quantized involved in the weight update iteration, wherein the predicted time point is configured to determine whether the data bit width needs to be adjusted or not, and the predicted time point corresponds to the time point when the weight update iteration is completed, and
determining the corresponding target iteration interval according to the variation trend value of the point position parameter.

12. The method of claim 11, wherein the predicted time point includes a first predicted time point, wherein the first predicted time point is determined according to the target iteration interval.

13. The method of claim 12, wherein the variation trend value of the data bit width is determined according to the corresponding quantization error.

14. The method of claim 12, wherein the predicted time point further includes a second predicted time point, wherein the second predicted time point is determined according to a curve of data variation range, and wherein the curve of data variation range is obtained by analyzing the data variation range in the process of weight update iteration.

15. The method of claim 14, wherein the determining a moving average value of a point position parameter corresponding to the current predicted time point includes:
determining the point position parameter corresponding to the current predicted time point according to a point position parameter corresponding to a previous predicted time point and an adjusted value of the data bit width,
adjusting a moving average value of a point position parameter corresponding to the previous predicted time point according to the adjusted value of the data bit width to obtain an adjusted result, and
determining the moving average value of the point position parameter corresponding to the current predicted time point according to the point position parameter corresponding to the current predicted time point and the adjusted result.

16. The method of claim 14, wherein the determining the moving average value of the point position parameter corresponding to the current predicted time point includes:
determining an intermediate result of the moving average value of the point position parameter corresponding to the current predicted time point according to the point position parameter corresponding to the previous predicted time point and the moving average value of the point position parameter corresponding to the previous predicted time point, and
determining the moving average value of the point position parameter corresponding to the current predicted time point according to the intermediate result of the moving average value of the point position parameter corresponding to the current predicted time point and the adjusted value of the data bit width.

17. The method of claim 11, wherein the determining data bit width used in the quantization process within the target iteration interval includes:
determining a corresponding quantization error, wherein pre-quantized data corresponding to the quantization error is the data to be quantized involved in the weight update iteration corresponding to the predicted time point, and determining the data bit width used in the quantization process within the target iteration interval according to the corresponding quantization error.

18. The method of claim 17, wherein the determining data bit width used in the quantization process within the target iteration interval includes:

comparing the quantization error with the threshold to obtain a comparison result, and adjusting the data bit width used in the quantization process within the previous target iteration interval according to the comparison result to obtain an adjusted result, wherein the adjusted result is taken as the data bit width used in the quantization process within a current target iteration interval.

19. The method of claim 17, wherein the pre-quantized data is the data to be quantized in the weight update iteration within a target iteration interval, wherein the target iteration interval includes at least one weight update iteration and a same quantization parameter is used in the quantization process within a same target iteration interval.

20. The method of claim 19, wherein the determining the target iteration interval includes:

at a predicted time point, determining a variation trend value of a point position parameter of data to be quantized involved in the weight update iteration, wherein the predicted time point is used to determine whether the quantization parameter needs to be adjusted or not, and the predicted time point corresponds to the time point when the weight update iteration is completed, and determining the corresponding target iteration interval according to the variation trend value of the point position parameter.

21. A device for determining quantization parameters in a neural network, comprising a non-transitory memory and a processor, wherein a computer program that can be run on the processor is stored on the memory, and the processor implements the method of claim 1 when executing the computer program.

22. A non-transitory computer readable storage medium, on which a computer program is stored, wherein the method of claim 1 is implemented when the computer program is executed.

* * * * *